United States Patent
Simmons

(10) Patent No.: US 9,561,456 B2
(45) Date of Patent: *Feb. 7, 2017

(54) ASSEMBLY, KIT AND METHOD FOR SECURING A COVERING TO AN AIR INTAKE FACE

(71) Applicant: Randy Simmons, West Chester, OH (US)

(72) Inventor: Randy Simmons, West Chester, OH (US)

(73) Assignee: The Newway Company, Inc., Commerce Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,433

(22) Filed: Aug. 31, 2015

(65) Prior Publication Data

US 2015/0375152 A1 Dec. 31, 2015

Related U.S. Application Data

(63) Continuation-in-part of application No. 13/296,616, filed on Nov. 15, 2011, now abandoned, which is a
(Continued)

(51) Int. Cl.
*E06B 3/28* (2006.01)
*B01D 46/00* (2006.01)
(Continued)

(52) U.S. Cl.
CPC ............ *B01D 46/0005* (2013.01); *E06B 9/01* (2013.01); *E06B 9/24* (2013.01); *E06B 9/52* (2013.01);
(Continued)

(58) Field of Classification Search
CPC ...... B01D 46/0005; F24F 13/082; E06B 9/01; E06B 9/52; E06B 9/24; E06B 2009/015; E06B 2009/527; F16B 1/00; F16B 11/006; F16B 2001/0035; F16M 13/02; F16M 13/022
(Continued)

(56) References Cited

U.S. PATENT DOCUMENTS 2,960,734 A * 11/1960 Collins ................. E06B 3/2605
160/353
3,866,380 A * 2/1975 Benson ................... E06B 3/667
403/205
(Continued)

OTHER PUBLICATIONS

International Serarch Report, PCT/US2012/065314—Dated May 15, 2013 6 pages.
(Continued)

*Primary Examiner* — Basil Katcheves
*Assistant Examiner* — Joshua Ihezie
(74) *Attorney, Agent, or Firm* — Dinsmore & Shohl LLP; Douglas Mcevoy

(57) ABSTRACT

A fastening system for applying, over an opening and surrounding fascia of a structure, a covering material including either of a flexible or rigid outer reinforced extending perimeter within which is configured a plurality of receiving apertures. At least one elongated rail adapted to being secured to the fascia in extending fashion proximate the opening, each of the rails exhibiting a three dimensional cross sectional shape with a forwardly projecting support surface within which is configured an outwardly facing narrowed slot. A plurality of fasteners each include a planar shaped base installable through an accessible end location of each of the rails so as to be traversable along an interior channel defined in the rail. A further rotatable portion of each fastener projects from the insertable base through the outwardly facing slot and in order to be rotated from a first position aligning with and seating over perimeter defined
(Continued)

receiving apertures of the covering material to a second position in order to affix the material.

19 Claims, 25 Drawing Sheets

Related U.S. Application Data continuation-in-part of application No. 13/205,908, filed on Aug. 9, 2011, now abandoned.

(51) Int. Cl.
*F16B 11/00* (2006.01)
*F16B 1/00* (2006.01)
*F16M 13/02* (2006.01)
*E06B 9/01* (2006.01)
*E06B 9/24* (2006.01)
*E06B 9/52* (2006.01)
*F24F 13/08* (2006.01)

(52) U.S. Cl.
CPC ............. *F16B 1/00* (2013.01); *F16B 11/006* (2013.01); *F16M 13/02* (2013.01); *F16M 13/022* (2013.01); *F24F 13/082* (2013.01); *F24F 13/084* (2013.01); *E06B 2009/015* (2013.01); *E06B 2009/527* (2013.01); *F16B 2001/0035* (2013.01)

(58) Field of Classification Search
USPC .................................................. 52/202, 203
See application file for complete search history.

(56) References Cited

U.S. PATENT DOCUMENTS

| | | | | |
|---|---|---|---|---|
| 4,079,558 A * | 3/1978 | Gorham | ................... | E06B 3/28 335/302 |
| 4,387,541 A * | 6/1983 | Boomershine | ............ | E06B 3/28 52/202 |
| 4,409,758 A * | 10/1983 | Dickerson | ................. | E06B 3/28 160/231.2 |
| 4,441,290 A * | 4/1984 | Abell | ...................... | E06B 3/285 52/202 |
| 4,452,138 A * | 6/1984 | Bubley | ...................... | B41C 1/14 101/127.1 |
| 4,465,499 A | 8/1984 | Wawro et al. | | |
| 4,745,769 A | 5/1988 | Wooden, Jr. | | |
| 4,909,004 A * | 3/1990 | Panttila | ................... | E06B 9/521 160/114 |
| 4,971,130 A * | 11/1990 | Bentley | ................... | E06B 3/285 160/127 |
| 5,131,188 A | 7/1992 | Hutchison et al. | | |
| 5,141,046 A | 8/1992 | Duncan | | |
| 5,370,722 A | 12/1994 | Simmons | | |
| 5,399,180 A | 3/1995 | Kopp | | |
| 5,547,011 A * | 8/1996 | Dotson | ..................... | E06B 9/24 160/371 |
| 5,809,800 A | 9/1998 | Deal | | |
| 5,899,027 A * | 5/1999 | St. Louis | ................... | E06B 9/52 52/202 |
| 5,941,031 A * | 8/1999 | Fullwood | ................... | E06B 3/00 52/202 |
| 5,964,910 A | 10/1999 | Keele | | |
| 6,197,077 B1 | 3/2001 | Simmons et al. | | |
| 6,264,713 B1 | 7/2001 | Lewis, II | | |
| 6,334,881 B1 | 1/2002 | Giannetta et al. | | |
| 6,349,522 B1 | 2/2002 | Stevens | | |
| 6,393,777 B1 * | 5/2002 | Renfrow | ................... | E06B 9/02 248/475.1 |
| 6,406,508 B1 | 6/2002 | Bloomer | | |
| 6,430,954 B1 | 8/2002 | Smith | | |
| 6,464,745 B2 * | 10/2002 | Rivera | ................... | B01D 46/10 55/483 |
| 6,532,702 B1 * | 3/2003 | Scribner | ................... | E06B 9/02 411/348 |
| 6,623,203 B2 | 9/2003 | Kreyenborg et al. | | |
| 6,623,540 B2 | 9/2003 | Clayton et al. | | |
| 6,793,715 B1 | 9/2004 | Sandberg | | |
| 6,918,940 B1 | 7/2005 | Lackey et al. | | |
| 6,959,748 B2 | 11/2005 | Hudoba | | |
| 6,974,622 B2 * | 12/2005 | Wade | ........................ | E04C 2/20 428/134 |
| 6,978,579 B1 * | 12/2005 | Trinca | ....................... | E06B 9/02 49/50 |
| 7,062,884 B2 * | 6/2006 | Jaycox | ....................... | E06B 9/04 292/297 |
| 7,210,513 B2 * | 5/2007 | Goldenberg | ............. | E06B 9/54 160/296 |
| 7,323,028 B2 * | 1/2008 | Simmons | ........... | B01D 46/0005 55/351 |
| 7,387,654 B1 | 6/2008 | Byers | | |
| 7,416,577 B2 * | 8/2008 | Simmons | ........... | B01D 46/0005 55/491 |
| 7,604,127 B2 | 10/2009 | Freissle et al. | | |
| 7,842,116 B2 | 11/2010 | Simmons | | |
| 7,896,941 B2 | 3/2011 | Choi | | |
| 8,074,408 B1 * | 12/2011 | Motosko | ................... | E06B 9/02 49/57 |
| 2003/0134091 A1* | 7/2003 | Wade | ........................ | E04C 2/20 428/182 |
| 2003/0221380 A1* | 12/2003 | Kreps | ..................... | E05D 7/081 52/202 |
| 2004/0154242 A1* | 8/2004 | Hudoba | ................... | E06B 9/02 52/202 |
| 2005/0055905 A1* | 3/2005 | Sayer | ........................ | B01L 1/50 52/204.1 |
| 2005/0279065 A1 | 12/2005 | Simmons | | |
| 2006/0010792 A1* | 1/2006 | Biggers | ..................... | E06B 9/02 52/202 |
| 2007/0101666 A1* | 5/2007 | Munch | ..................... | E06B 9/02 52/202 |
| 2007/0204533 A1* | 9/2007 | Gower | .................. | E06B 9/0692 52/202 |
| 2009/0014371 A1 | 1/2009 | Cook | | |
| 2010/0146881 A1* | 6/2010 | Framer | ..................... | E06B 9/02 52/202 |

OTHER PUBLICATIONS

StayPut Fasteners, Horizontal, Vertical & Canvas to Canvas, 1 Page, Stayput Fasteners Australia, www.stayputfasteners.com.au, info@stayputfasteners.com.au , Australian Canvas and Synthethic Products Association, no date available.

* cited by examiner

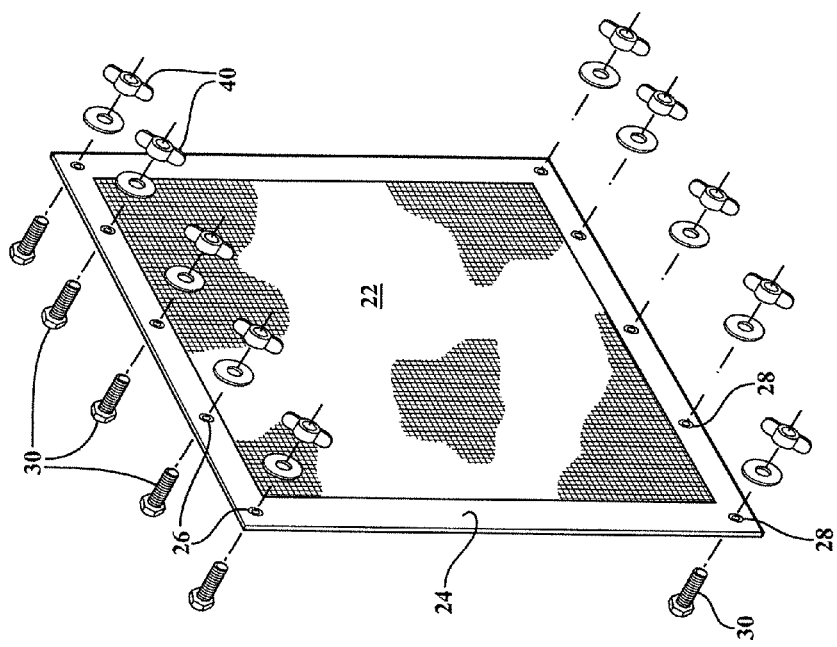
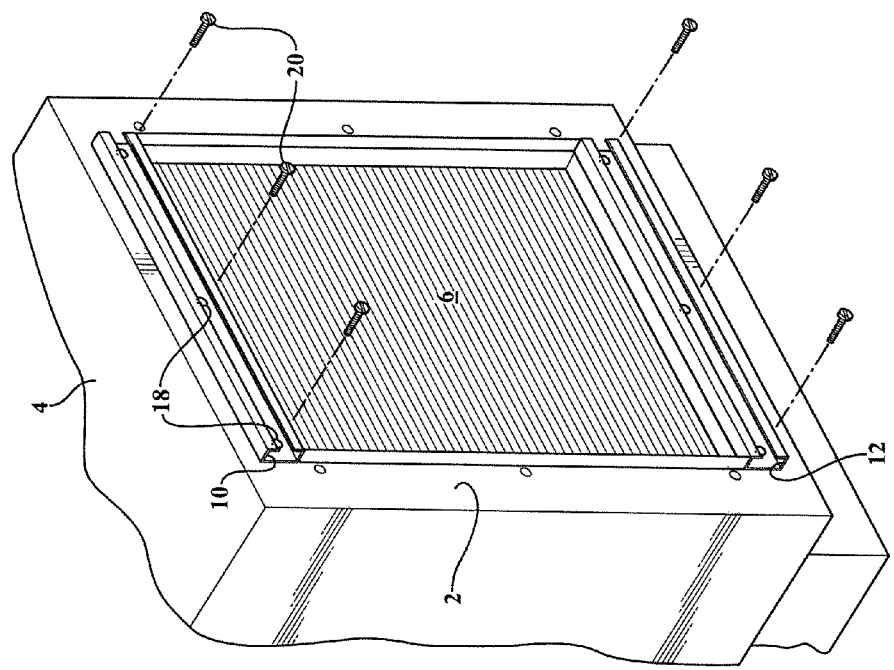
FIG. 1

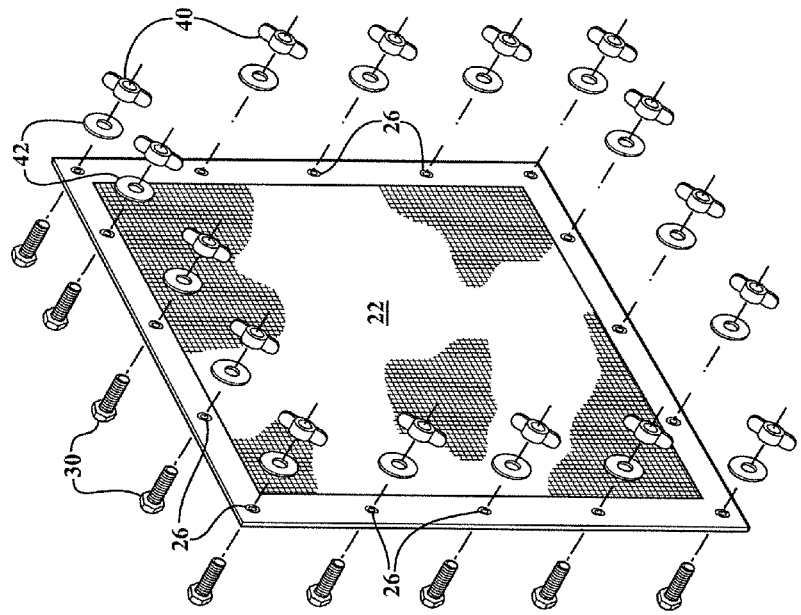
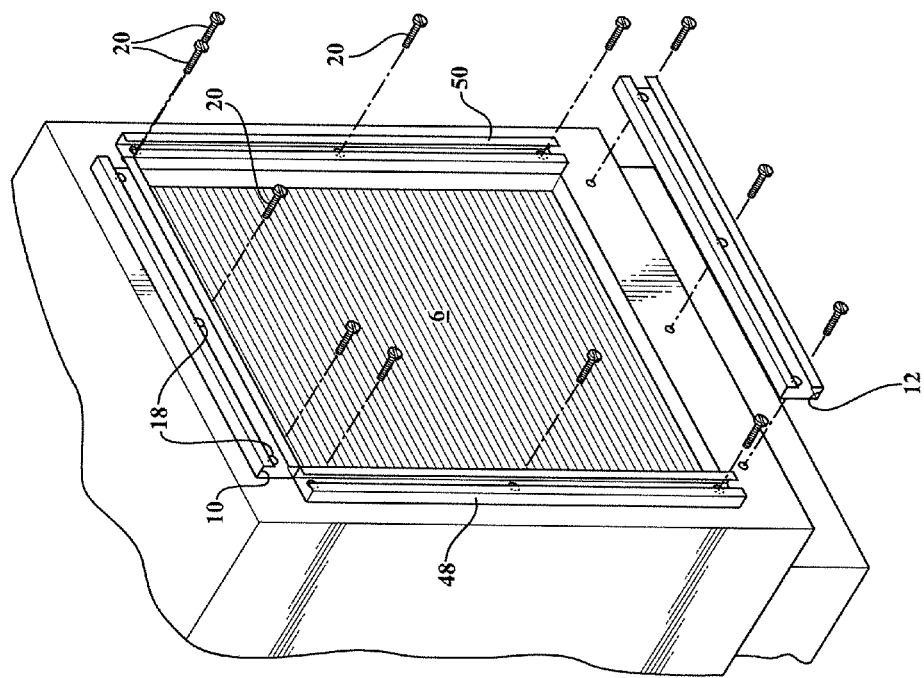
FIG. 2

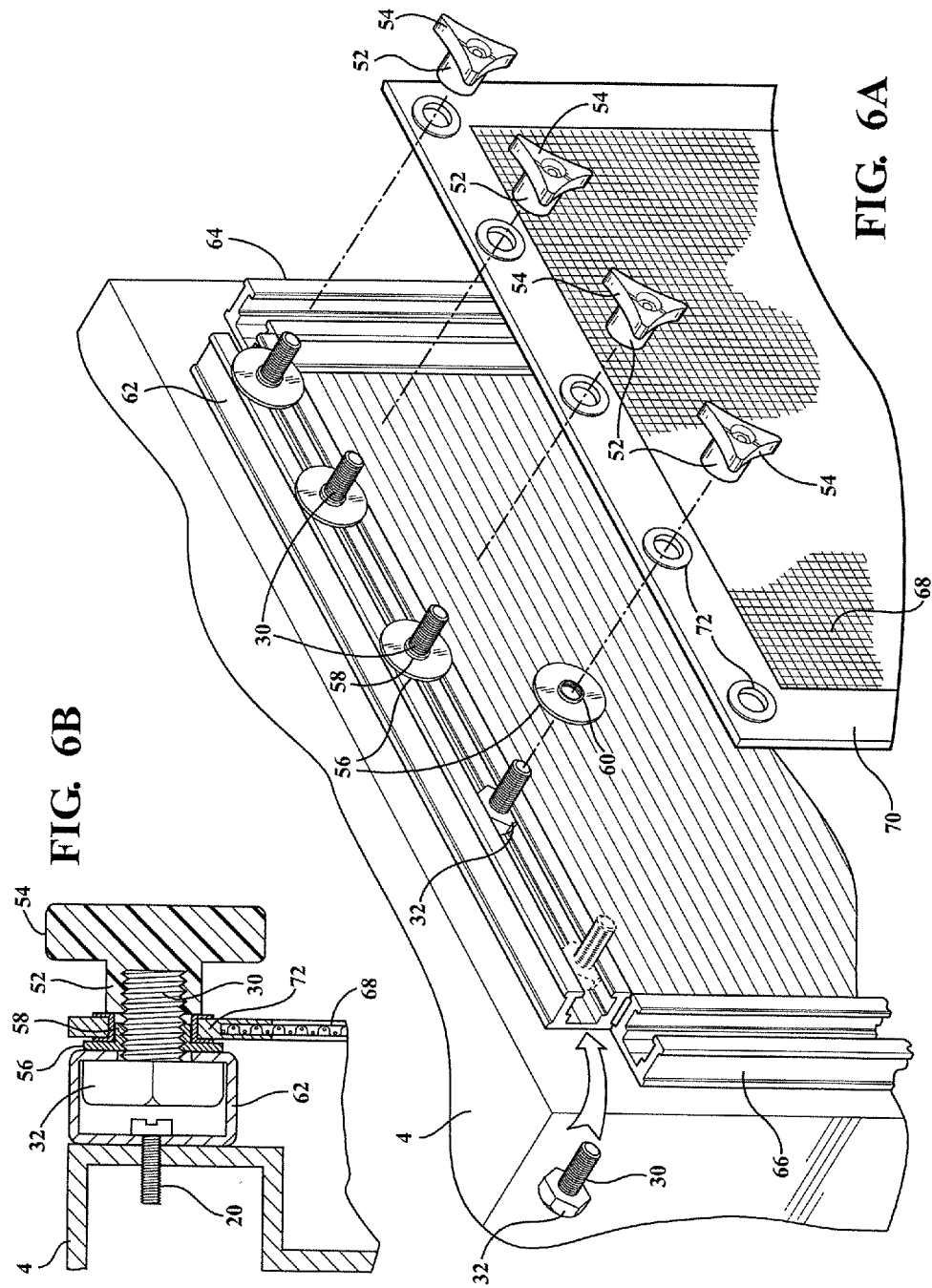

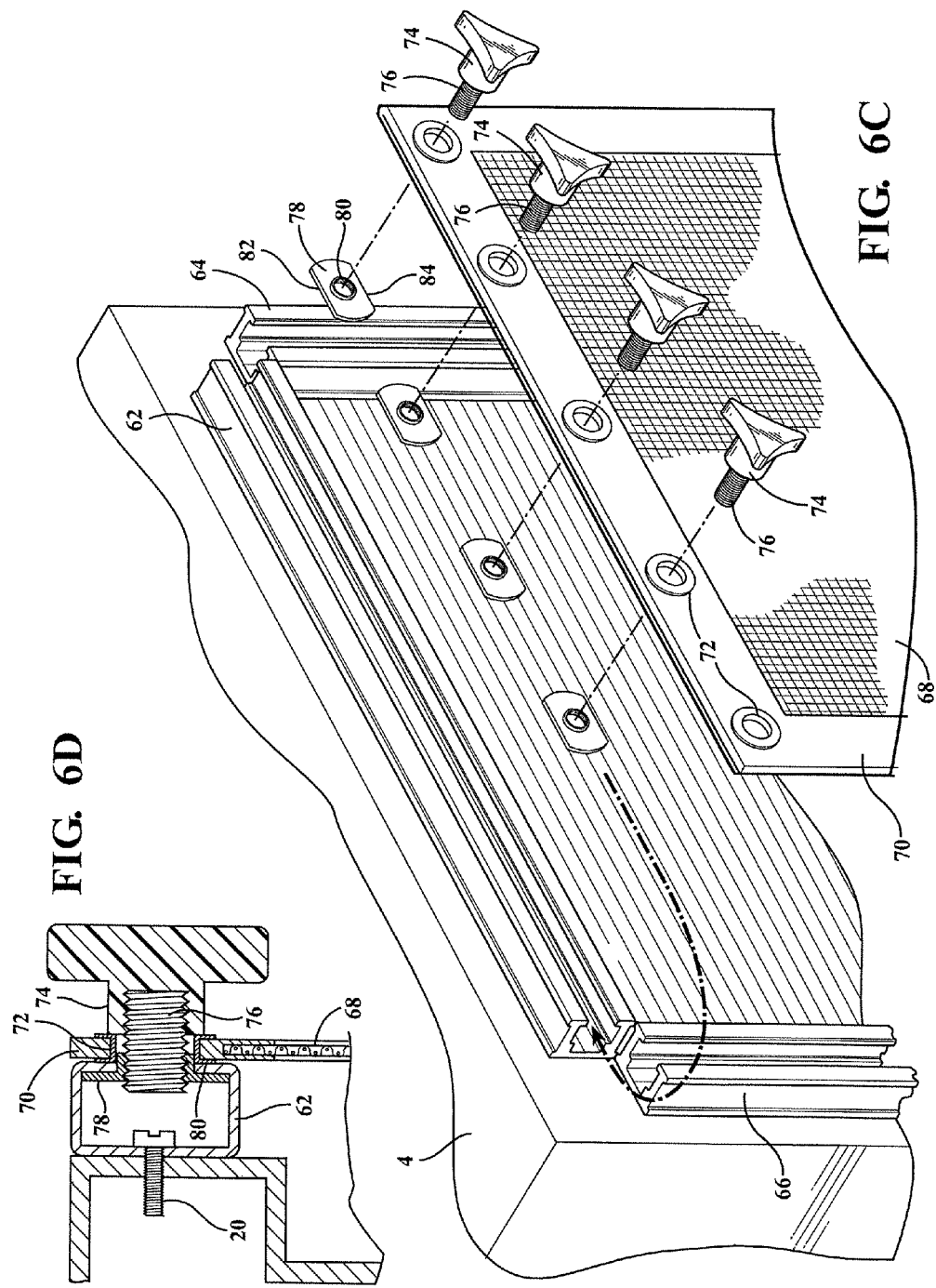

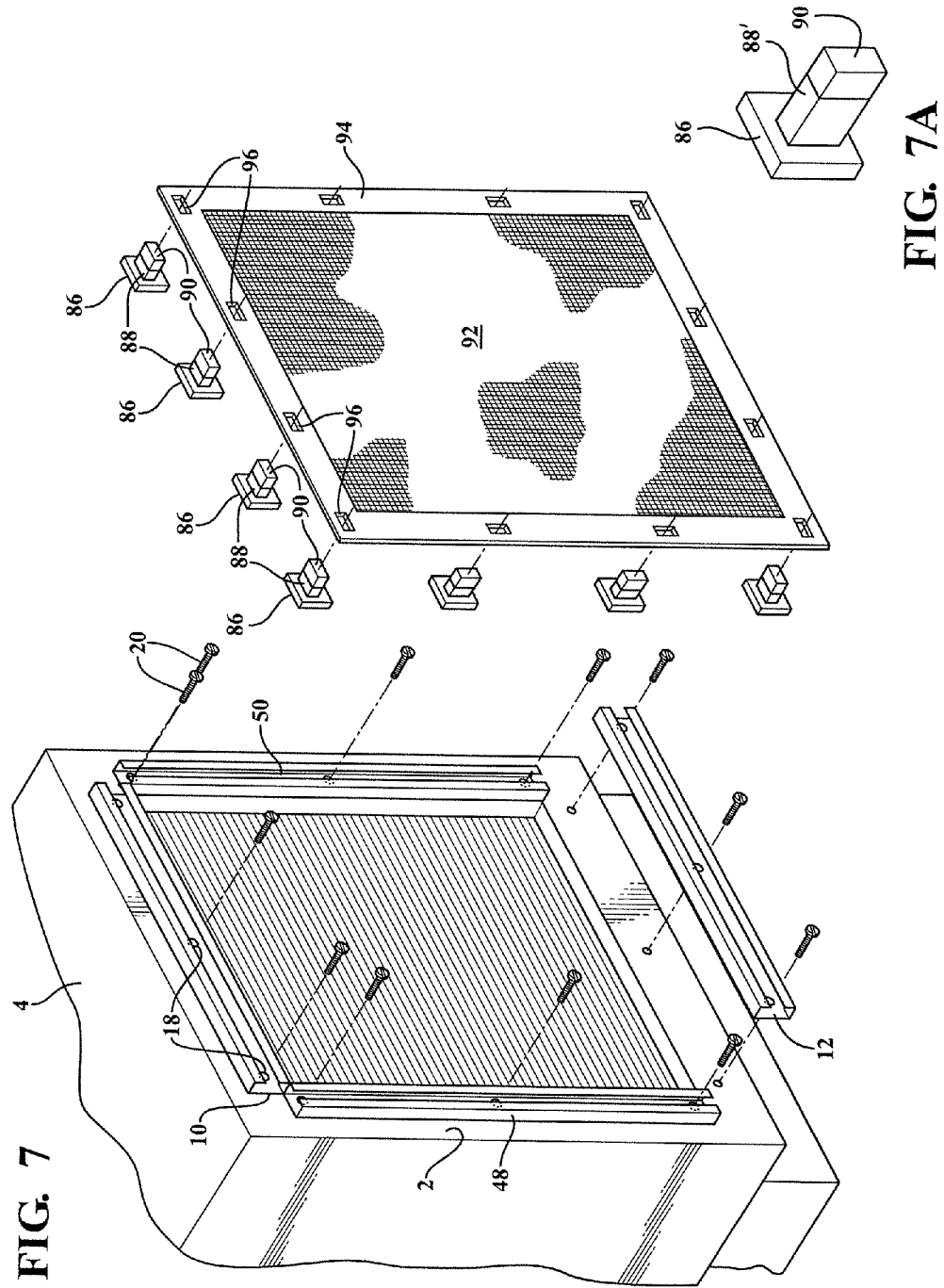

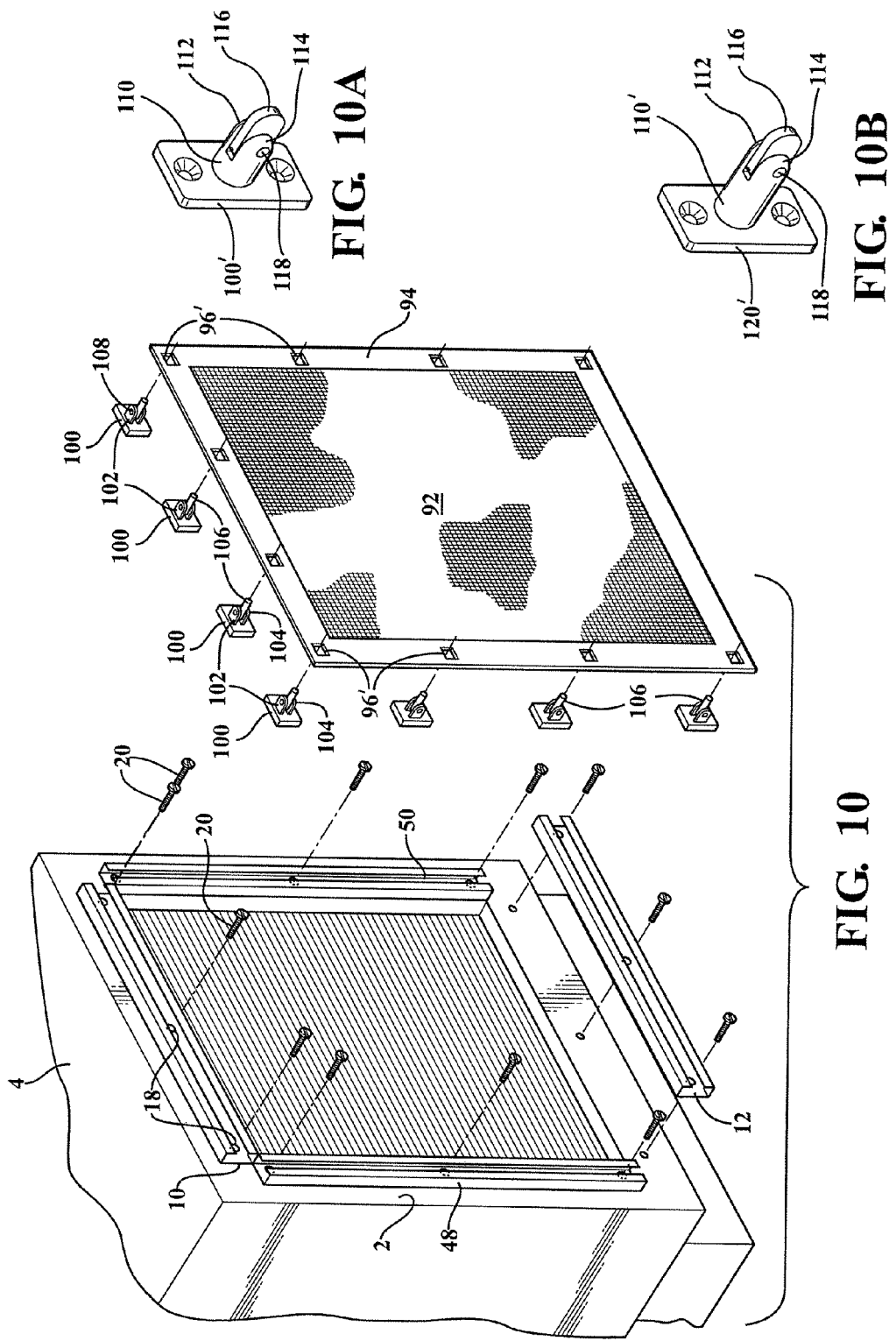

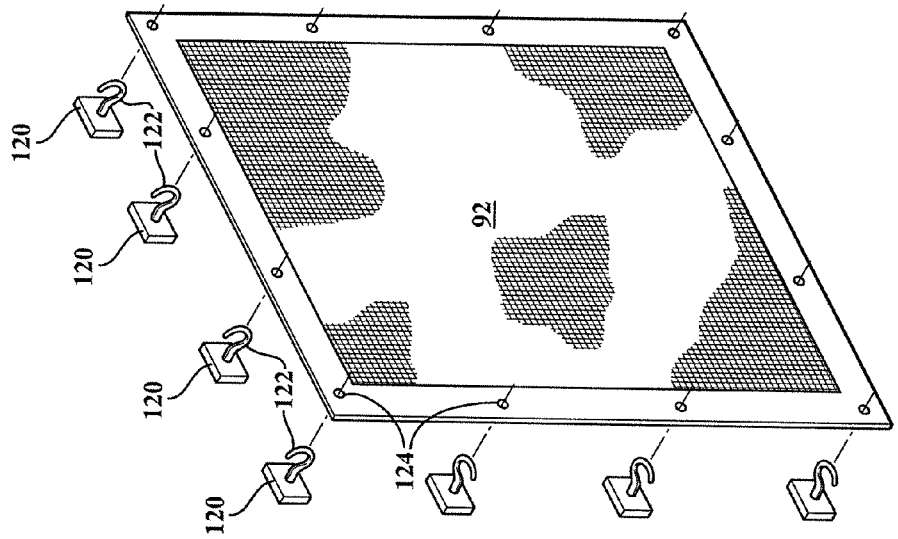
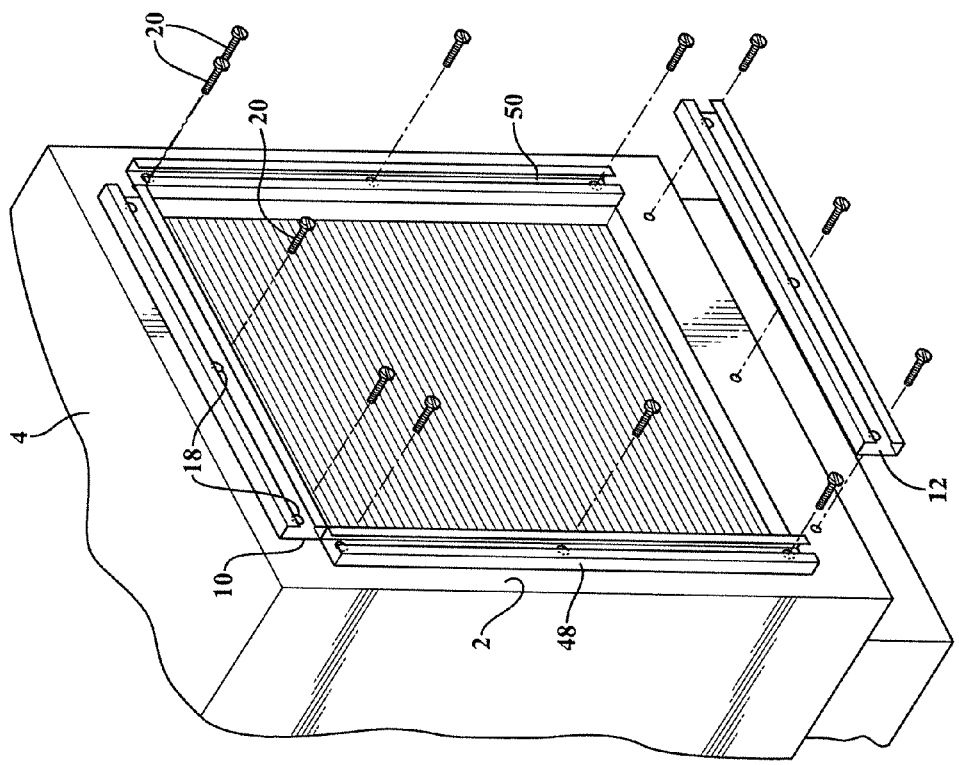
FIG. 13

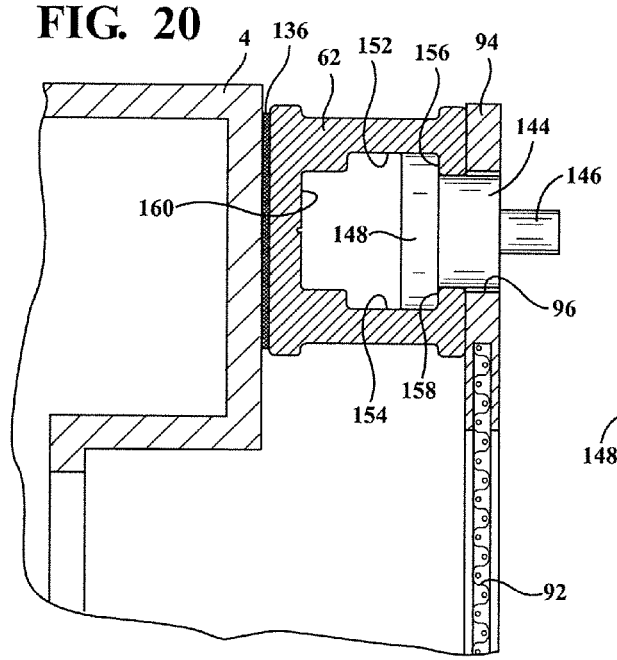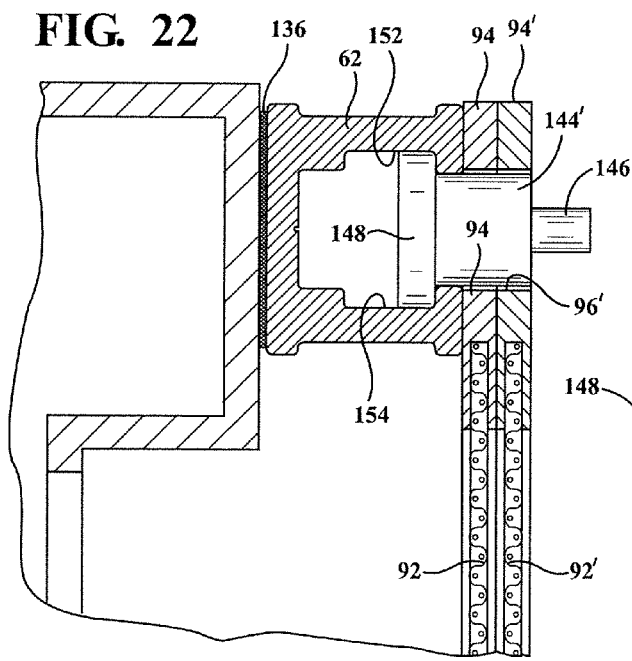

FIG. 24B
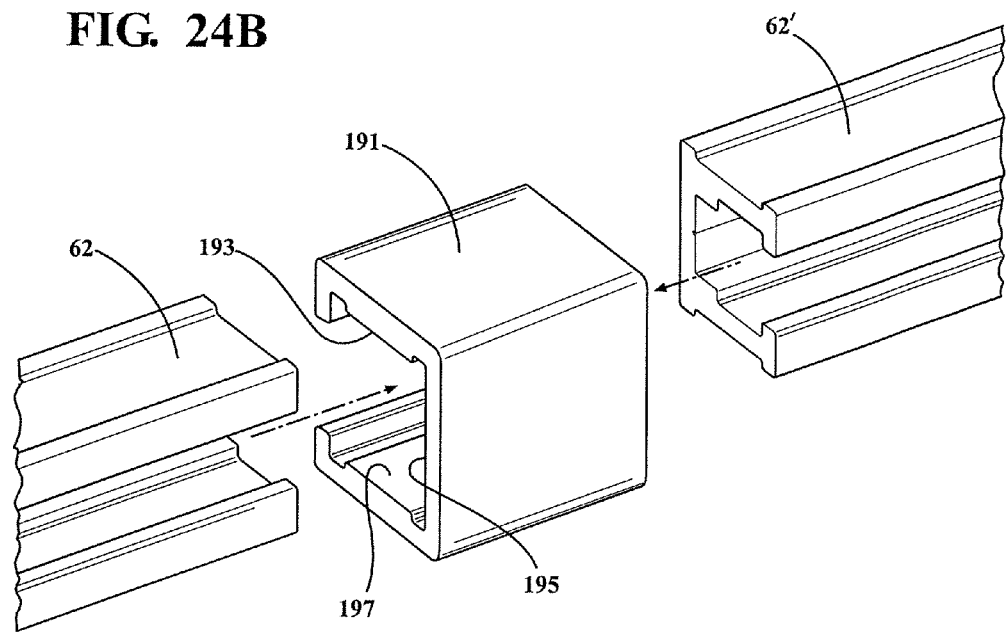
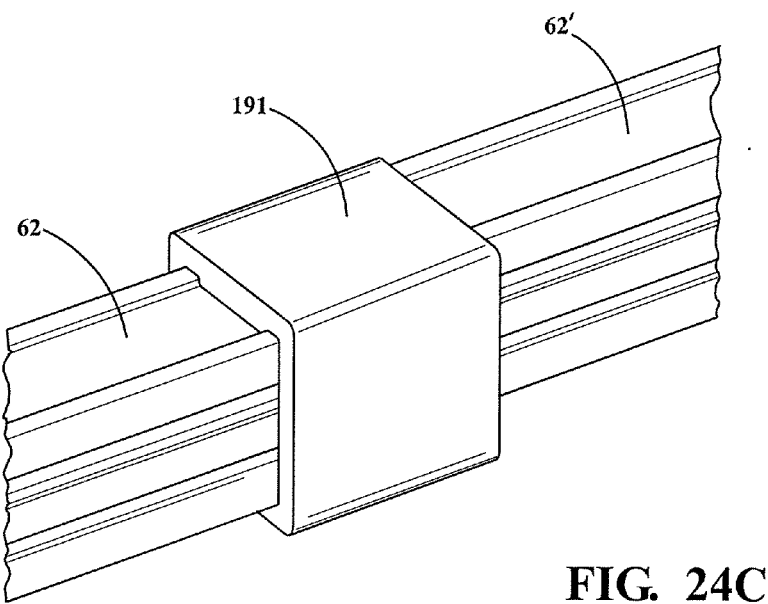
FIG. 24C

ASSEMBLY, KIT AND METHOD FOR SECURING A COVERING TO AN AIR INTAKE FACE

CROSS-REFERENCE TO RELATED APPLICATIONS

This Application is a Continuation-in-part of application Ser. No. 13/296,616 filed on Nov. 15, 2011. Application Ser. No. 13/296,616 is a Continuation-in-part of application Ser. No. 13/205,908 filed on Aug. 9, 2011.

FIELD OF THE INVENTION

The present invention is directed to an assembly for securing any of a filter screen or other covering (clear or opaque) to a perimeter extending face surrounding a central opening of an air intake structure, such as further including but not limited to any piece of conventional HVAC equipment. A plurality of elongated and interior channel or track defining supports are permanently or releasably secured to the intake face and, in combination with any type of fastener position-ally secured along the track defined support, secures the perimeter edge of the screen or covering over the arranged supports and central opening.

BACKGROUND OF THE INVENTION

Filter screen assemblies, such as utilized for covering an intake opening associated with an air handling unit, are known. Such screens are usually either affixed to the surrounding fascia extending around a perimeter of the intake opening, suspended from a curtain rod extending over the opening, or secured in some other fashion. Examples drawn from the prior art include such as U.S. Pat. No. 7,323,028, U.S. Pat. No. 7,842,116, U.S. Pat. No. 7,416,577, and U.S. Pat. No. 5,370,722, all to Simmons.

Wade, U.S. Pat. No. 6,974,622 recites both a method and a related track mounting and alignment kit for installing a rigid covering to a perimeter extending face surrounding a window opening so that a gap exists between the edges of the covering and the associated mounting tracks. Referring to FIGS. 4 and 5, the kit and assembly may utilize mounting tracks mounted to opposite sides (two only) of an opening, the mounting tracks being mounted along the top or bottom or along the lateral sides of the opening (window) utilizing any suitable fastener. The covering in Wade can be secure to the track utilizing a wing nut or other key type fastener.

SUMMARY OF THE INVENTION

The present inventions disclose an assembly/system, kit and related method for either permanently or releasably securing any combination of elongated supports to a perimeter defining face associated with an air intake. The elongated supports each include a modified "U" cross sectional shaped rail which is initially secured, such as via magnets, adhesive tape or fasteners, in a generally parallel extending fashion proximate to the fascia defined edges of an air intake structure opening.

A plurality of fasteners are provided and which are slidably installed through inner defined channels of the elongated supports, from end accessible locations thereof. The configuration of the fasteners are such that they can include enlarged hex heads or any other base configuration which does not rotate within the internal defined channels or pivot out through a forwardly facing and narrowed slot or opening through which the remaining portion of the fastener (threaded shafts, twist or toggle lock, hooks, clips, etc.) are permitted to project.

The attachable filter screen is particularly sized for use with a given frame configuration of pre-mounted rails and exhibits either of a naked (non-reinforced) or reinforced perimeter within which is configured a plurality of edge extending apertures and/or grommets, through which projects the extending portion of the desired fastener upon the screen being applied over the centrally defined intake opening. The screen can also include any covering (clear, opaque or otherwise) not limited to filtration. Yet additional variants contemplate the application of this technology to window, doorway (i.e. such as standard and larger garage door type entranceways) or any other suitable opening which it is desirous to cover in the manner described herein.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an exploded view of the assembly according to a first embodiment of the present invention and exhibiting a single pair of upper and lower horizontal extending and fascia supporting rails to which a filter screen is secured by the associated bolt fasteners;

FIG. 2 is a view similar to FIG. 1 of a system according to a second embodiment with first horizontal and second vertical pairs of intake face mounted rails;

FIG. 6A is a partially exploded perspective of a modification of the assembly of FIG. 6 and showing an arrangement of twist caps in use with the fasteners of FIG. 5;

FIG. 6B is a partial plan cutaway of a selected engagement established between a bolt, twist cap and modified washer with threaded interior collar against first and second surfaces of the filter screen or other supported covering;

FIG. 6C is a view similar to FIG. 6A of a related variant in which a modification of the outer twist cap integrates a threaded bolt, the bolt fasteners of FIG. 6A being removed and substituted by a reconfigured washer with threaded central support collar which is repositioned within the track following intermediate assembly with the twist cap and interposed filter;

FIG. 6D is a partial plan cutaway of a selected engagement established between the modified screw cap and track insertable washer of FIG. 6C against first and second surfaces of the filter screen or other supported covering;

FIG. 7 is an exploded illustration similar to FIG. 2 of a further embodiment incorporating a plurality of reconfigured and channel rail mounted twist lock fasteners;

FIG. 7A is an enlarged perspective of a modified twist lock fastener exhibiting a lengthened fixed support portion for accommodating any of thicker filter screens, multiple layer screens, or other coverings;

FIG. 10 is another exploded illustration similar to FIG. 7 of a yet further embodiment incorporation a plurality of reconfigured and channel rail mounted toggle lock fasteners;

FIG. 10A is a perspective of a variant of a toggle lock fastener;

FIG. 10B is a perspective of a further variant of a toggle lock fastener exhibiting a lengthened fixed support portion for accommodating any of thicker filter screens, multiple layer screens, or other coverings;

FIG. 13 is an exploded illustration of a yet further embodiment incorporating a plurality of reconfigured and channel rail mounted hook fasteners;

FIG. 20 is a cross sectional cutaway of a selected track support from FIG. 19 and illustrating an underside positioned magnet for assisting in releasably securing the support in extending fashion along a metal receiving surface of the intake face;

FIG. 21 is an illustration of a selected twist lock fastener utilized in the engagement protocol of FIG. 20 and exhibiting widened base support locations for facilitating frictional and positional fitting within the interior track defining sides of the support;

FIG. 22 is a cross sectional cutaway of a selected track support as previously shown in FIG. 20 and illustrating a variant of the twist lock fastener;

FIG. 23 is an illustration of the modified twist lock fastener, similar to that shown in FIG. 21, and exhibiting a lengthened fixed support portion for accommodating any of thicker filter screens, multiple layer screens, or other coverings;

FIGS. 24B-24C respectively illustrated exploded and assembled views of a further three sided variant of linear end-to-end adaptor which is configured to attached abutting opposing ends of first and second selected running lengths of support track;

DETAILED DESCRIPTION OF THE PREFERRED EMBODIMENTS

Figure 3:
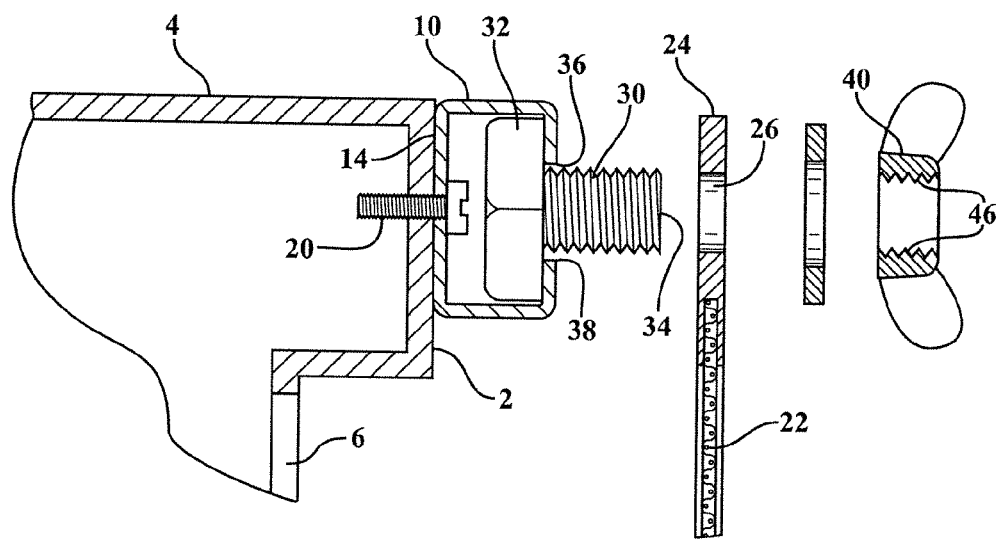
FIG. 3 is a side cutaway view in exploded fashion of a pre-assembly location of a selected bolt fastener, rail location, screen with reinforced edge located grommet, washer and wing nut.

As will be further described with reference to the succeeding illustrations, the present invention discloses a system/assembly, kit and method of assembling a plurality of track supports with to a surrounding fascia associated with an air intake opening, these in combination with a variety of screens/coverings, fasteners for supporting the screen on the assembled supports, and optional end-to-end and corner adaptors/plugs for arranging the track supports according to any desired orientation. As will be explained in further detail, the present invention enables attachment of any number of the support tracks to the face of air handling mechanical equipment, this including the use of magnets to accomplish releasable attachment of the elongated supports to the surface of the air intake face. Other variants contemplate any of adhesives, including two sided tape or glue, as well as conventional fasteners (screws, bolts, etc.) for securing the track supports to the intake face.

Referring to FIG. 1, an exploded view is generally depicted of the channel lock filter fastening system according to a first embodiment of the present invention and exhibiting a single pair of upper and lower horizontal extending and fascia supporting rails, see at 10 and 12, which are secured at extending locations along a fascia surface 2 associated with an air intake structure 4 (such further understood to include any suitable type of air handling mechanical equipment not limited to air conditioner condenser units, cooling towers etc.). As further depicted in each of succeeding views FIGS. 3-6, each of the rails (see for example first upper horizontal extending rail 10) exhibits a three dimensional, and typically modified "U", shape with a base surface (see at 14 in each of FIGS. 3-6).

A plurality of spaced apart apertures are defined by inner perimeter extending circular edges 18 (see again rail 10 in each of FIGS. 1 and 2). A plurality of screw fasteners 20 are provided and insert through the circular apertures in order to fasten the rails 10 and 12 in horizontal and parallel extending fashion above and below an intake opening or area which is further generally designated at 6 in each of FIGS. 1-4.

A filter screen 22 is provided, typically exhibiting a flexible mesh like material and including a surrounding reinforced outer portion 24. First 26 and second 28 pluralities of grommets (such interpreted to include metal ringlets or the like which are molded, press fit or otherwise affixed), extend along top and bottom outer hem extending locations of the reinforced outer portion 24.

A plurality of bolt fasteners 30 are provided and are identical in construction as with the various edge extending grommets or screw fasteners. As best shown in FIGS. 3-6, an enlarged head 32 (typically hexagonal shaped) is dimensioned so that it establishes a minor degree of clearance with the inner extending edges of the associated channel defined in the selected rail 10. This facilitates the bolts 30 to be successively installed through an open accessible end of the rail 10 (see FIG. 5) and traversable along the channel interior to desired intermediate locations, and with an end 34 of each bolt shaft projecting beyond a slot (see walls 36 and 38 in partially exploded view of FIG. 3) defined in a forward spaced projecting edge of the rail.

Figure 4:
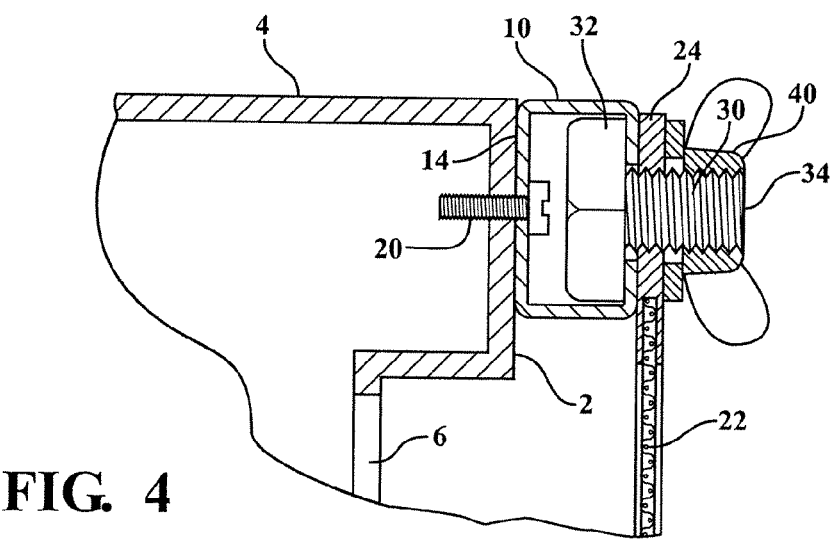
FIG. 4 is a succeeding assembly location of the components depicted in FIG. 3.
Figure 6:
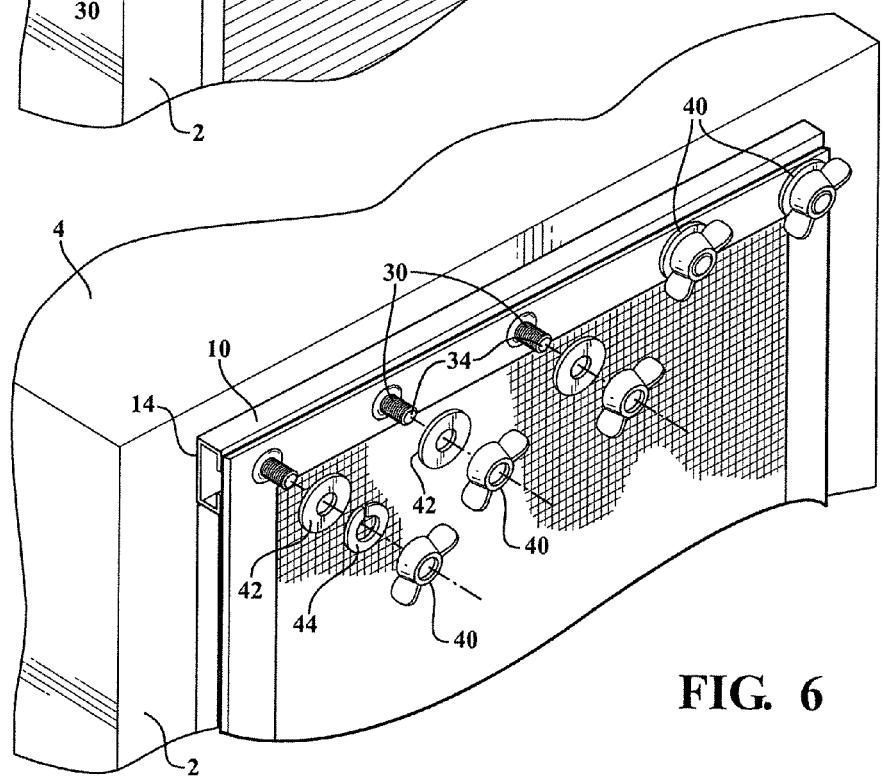
FIG. 6 is a succeeding assembly stage to FIG. 5 in which the perimeter edge extending filter screen grommets are seated upon the projecting shafts and at which the washers and wing nuts are attached.

At this point, and viewing FIGS. 1, 4 and 6 collectively, the filter screen 22 is applied such that the ringlets 26 are successively seated over the projecting shaft ends 34, following which a plurality of nuts, by non-limiting example depicted as wing nuts 40, are applied over the exposed shaft ends and are rotated into a tightening arrangement in order to secure the filter screen to the rails 10 and 12. Also depicted are a plurality of washers 42 (see FIG. 6) this also contemplating the additional or alternate use of lock washers (further at 44 in FIG. 6) and so as to prevent the filter from becoming inadvertently loosened from the intake structure fascia.

Alternative to separately provided washers/lock washers, it is also envisioned that suitable washer/lock washer portions can be integrally formed into the wing nut (or other nut) construction. It is further envisioned that, referring to FIG. 3, a suitable nylon coating 46 can be applied to the inner threads associated with each wing nut 40 and which can be accomplished both in combination or alternate the incorporation of any type of separately utilized or integrally formed lock washers. It is further understood that the configuration and dimensioning of the enlarged bolt heads is such that, during twisting application of the nuts 40, the heads 32 do not turn or rotate within the channels (see again FIGS. 3 and 4), such otherwise impeding the ability to quickly apply or remove the nuts 40.

FIG. 2 is a view similar to FIG. 1 of a system according to a second embodiment which differs only to the extent that it adds a second vertical pair of intake face mounted rails 48 and 50 applied to opposite and vertically extending sides of the fascia 2 in such a fashion that the first (10 and 12) and second pairs (48 and 50) of rails collectively establish a generally rectangular shape (this including a square shape in the instance in which the sides of the intake opening and the lengths of all the rails are co-equal). Otherwise, the filter 22 is as previously disclosed in claim 1 with the corresponding modification to include additional grommets 26 likewise extending along the vertical side edges of the reinforced outer frame (also hem or skirt) with corresponding additional bolts 30, wing nuts 40 and washers 42 likewise being provided so as to progressively secure the filter 22 along each of four interconnecting edges and as opposed to only two upper and lower edges as is the case in the illustration of FIG. 1. Such an assembly option as depicted in FIG. 2 contemplates, without limitation, that the bolts, nuts and washers associated with the upper rail 10 are first assembled, following which the sides 48 and 50 are progressively assembled such as further by individually supporting the bolts within the vertical channels during progressive assembly of the nuts and washers. That said, the present invention does not preclude or limit any particular assembly protocol or sequence beyond that which is possible owing to the structural aspects of the design.

Figure 5:
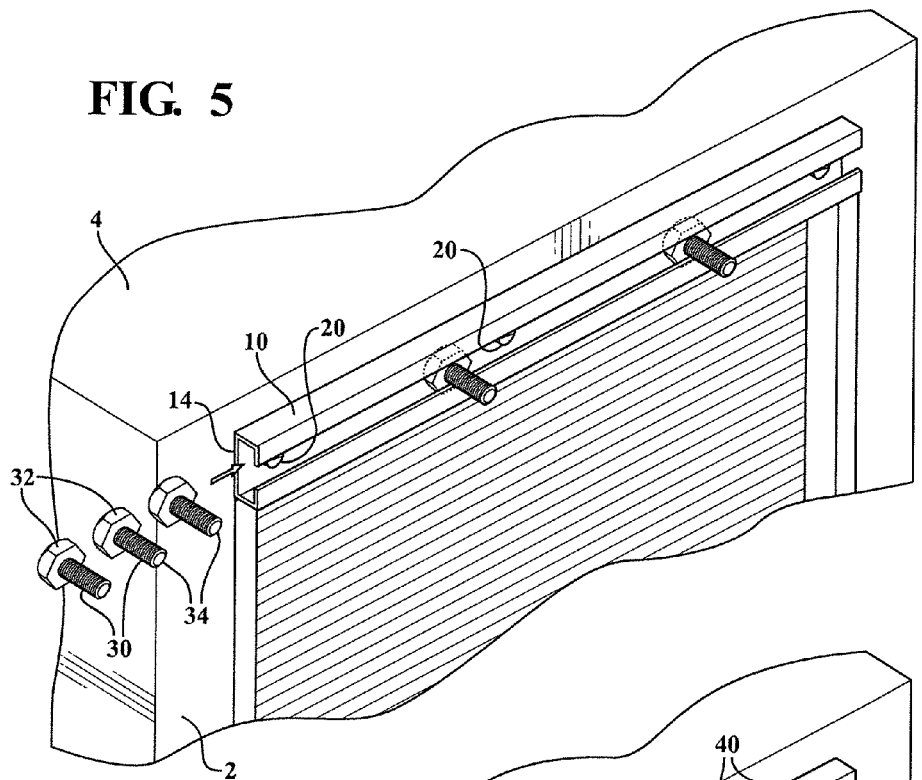
FIG. 5 is a perspective illustration of an initial pre-assembly step including the installation of a plurality of bolt head fasteners into the modified "U" shaped and fascia attachable rails with threaded shafts projecting through an outwardly facing narrowed slot.

Referring now to FIG. 6A, a partially exploded perspective of a modification of the assembly of FIG. 6 and showing an arrangement of twist caps 52 in use with the fasteners (threaded shafts 30 which are also termed "snug nuts" as well as an equal number of hex heads 32) of FIG. 5. The twist caps depict collars which are interiorly threaded from an open inner end (not shown) and further each include a triangular (or other suitable and polygonal) shaped gripping end 54. The caps 52 are further constructed of a plastic or other suitable material.

As additionally shown in FIG. 6B, an equal plurality of modified washers 56 are provided, each of these including a protuberant collar 58 defining an interiorly threaded profile 60. The bolts (hex head 32 and stem 30) are pre-installed into an open channel end defined in a modified support track (see at 62, 64 and 66 in FIG. 6 arranged about the intake opening of the associated structure 4) and so that the threaded stems 30 projecting through the front disposed slot in the manner depicted. The elongated track supports are similar in application to those previously disclosed at 10 and 12 in FIG. 1 and can include a slightly modified extrusion profile and, as will be further described, can be attached both to the face of intake structure and interconnected in end-to-end fashion according to a variety of different configurations.

A flexible ply material or covering, such as any screen or mesh utilized in a filtration application or an opaque covering in the instance of a sealing or winterizing application, is provided at 68. The material may include a reinforced outer perimeter 70 and can further exhibit a plurality of reinforced ringlets 72 (also termed grommets) integrated into the outer perimeter of the material. In application, and as again referenced in the partial plan cutaway of FIG. 6B, a selected engagement is established between a bolt, twist cap and modified washer with threaded interior collar against first and second surfaces of the filter screen or other supported covering 68.

FIG. 6C is a view similar to FIG. 6A of a related variant in which a modification of the outer twist cap, see at 74 in comparison to as shown at 52 in FIG. 6A) integrates a threaded bolt 76. The bolt fasteners of FIG. 6A are removed in this variant and substituted by a reconfigured washer 78 with threaded central support collar 80. The washers 78 each exhibit linear upper 82 and bottom 84 edges and are dimensioned such that they are insertable through the open end of the track supports 62, 64, 66, et seq.

In practice, and owing to the lack of a projecting component through the front defined and slot accessible face of each track support, the threaded portions 76 of the twist nuts 74 are typically pre-engaged through the material ringlets 72 and the inner threaded collars 80 of the modified/flattened washers in an intermediate assembled fashion, such prior to the washers being installed from the open channel ends of the supports. In this fashion, the twist nuts 74 are used for translating the washers within the supports prior to finished tightening. This is further depicted in FIG. 6D which, similar to FIG. 6B, is a partial plan cutaway of a selected engagement established between the modified screw cap and track insertable washer of FIG. 6C against first and second surfaces of the filter screen or other supported covering. As further shown, the linear edges 82/84 of the modified washers 78 can be dimensioned, if desired, such that they establish a desired friction engagement with the inside channel defining sides of the track supports 62, 64, 66, et seq., this in order to assist in maintaining their position within the supports during completion of installation.

Figure 8:
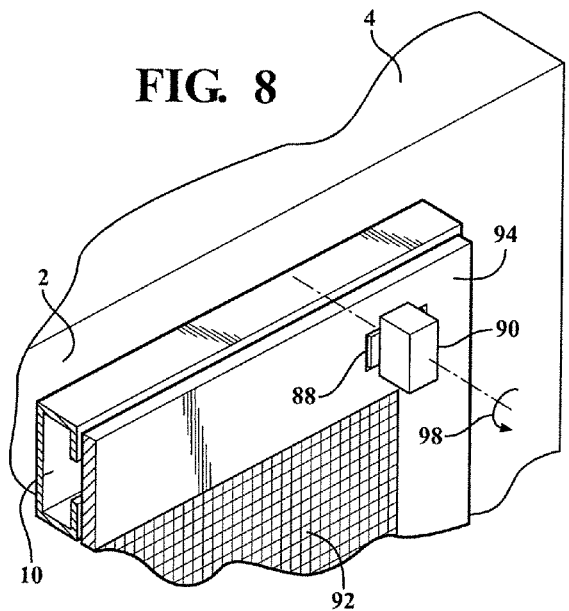
FIG. 8 is an enlarged, assembled and corner perspective of the embodiment of FIG. 7 and illustrating a selected corner located twist lock fastener in an engaged position relative to an outer receiving location of the outer covering.
Figure 9:
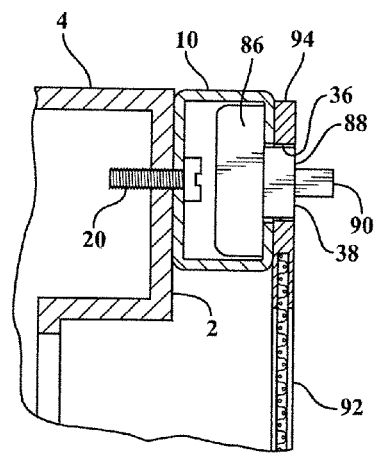
FIG. 9 is a side view corresponding to FIG. 4 in the preceding embodiment illustrating the configuration of the selected twist lock fastener of FIG. 8 in engagement with the screen.

Referring now to FIG. 7, an exploded illustration similar to FIG. 2 of a further embodiment incorporating a plurality of reconfigured and channel rail mounted twist lock fasteners, each of which including a flat rectangular shaped base 86 which is dimensioned for seating in laterally slidable fashion within the open channel interior defined in relation to each rail 10, 12, 48, 50 (as previously described in the preceding embodiments). The inserting base 86 in turn supports a reduced dimensioned fixed portion 88 which in turn seats through the linear slot defined between inner extending walls 36 and 38 (this as best shown in FIGS. 8 and 9 and such that the both the fixed portion 88 and underlying channel seating base 86 are permitted to slide but not rotate relative to the rails). FIG. 7A is an enlarged perspective of a modified twist lock fastener exhibiting a lengthened fixed support portion 88' extending from the base 86 and for accommodating any of thicker filter screens, multiple layer screens, or other coverings;

A further twist and lock portion 90 is mounted via a pin or stud in a rotatable fashion relative to the fixed support 88. A screen or like covering 92 exhibits a flexible or rigid perimeter extending edge 94 within which is defined an array of perimeter spaced apart rectangular apertures 96 (as opposed to circular apertures 28 depicted in the variant of FIG. 1). Without limitation, the apertures in the covering can also exhibit any other shape or profile.

In this fashion, and upon the twist lock portions being first rotated to a flush profile with the underlying fixed portions 88 (FIG. 7), the fasteners are prepositioned within the rails so that the twist lock portion 90 and the upper part of the underlying fixed portion 88 collectively seat through the apertures 96 (see FIG. 9). At this point, the twist lock portion 90 is rotated ninety degrees about a horizontal axis (see arrow 98 in FIG. 8) and so that an offset portion of the underside of each twist lock portion 88 prevents removal of the covering 92.

Figure 8A:
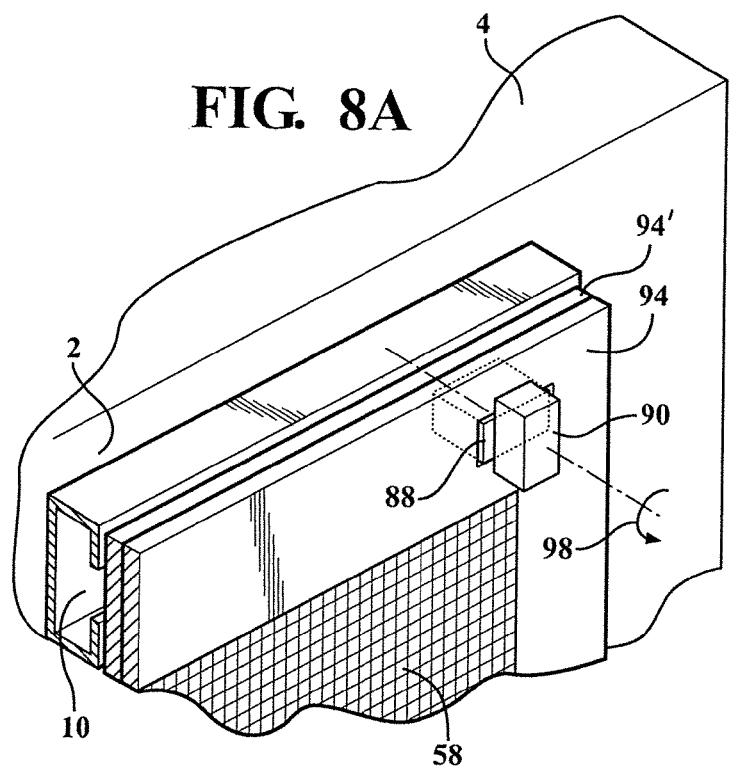
FIG. 8A is an illustration similar to FIG. 8 of a variant of the twist lock fastener for supporting a dual layer screen upon a selected elongated support track.
Figure 9A:
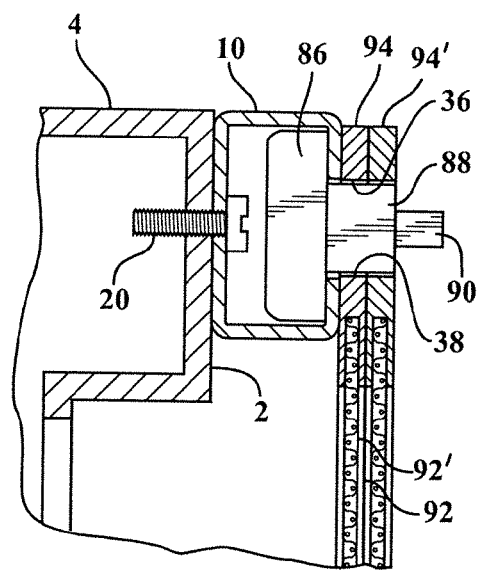
FIG. 9A is a corresponding side view of the twist lock fastener of FIG. 8A in engagement with the dual layer screen.

FIG. 8A is an illustration similar to FIG. 8 of a variant of the twist lock fastener for supporting a dual layer screen, see at 92 and 92' with corresponding reinforced edges 94 and 94', upon a selected elongated support track. FIG. 9A is a corresponding side view of the twist lock fastener of FIG. 8A in engagement with the dual layer screen 94/94'.

In this manner, the various fasteners are capable of being preposition along either or both of first and second opposing pairs of surface mounted rails 10/12 and/or 48/50 in a manner which facilitates quick location, installation and removal of the covering. The covering material 92 can again include any type of screen or mesh as well as also contemplating the use of impermeable covering or insulating materials. It is further envisioned that the outer perimeter or binding 94 of the covering material can include either rigid or flexible materials.

Figure 11:
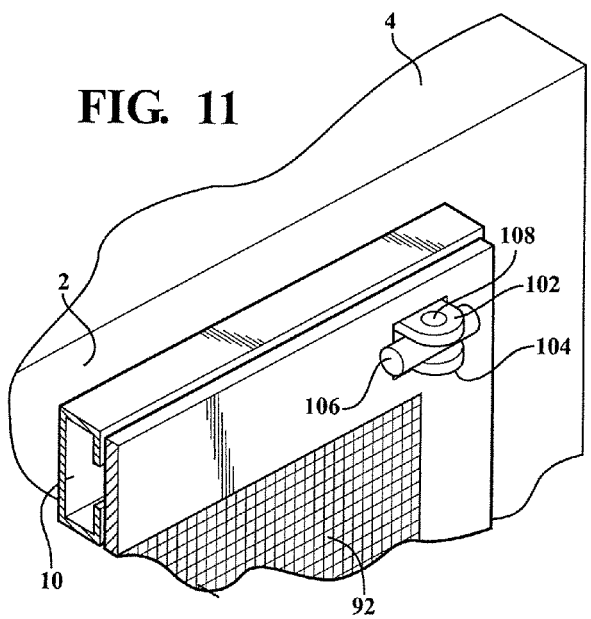
FIG. 11 corresponds to FIG. 8 and illustrates a selected corner located toggle lock fastener in engaged position relative to an outer receiving location of the outer covering.
Figure 12:
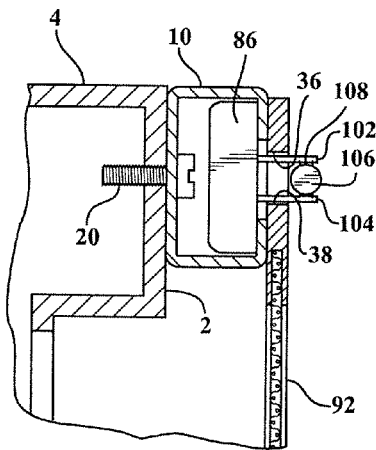
FIG. 12 corresponds to FIG. 9 and illustrates the configuration of the selected toggle lock fastener in engagement with a filter screen.

Referring to FIG. 10 in combination with FIGS. 11-12, another exploded illustration similar to FIG. 7 is provided of a yet further embodiment incorporating a plurality of reconfigured and channel rail mounted toggle lock fasteners. Each of the toggle lock fasteners includes a generally flat and rectangular shaped channel seating base 100 of a shape and dimension similar to that previously identified at 86 in regards to the twist lock fasteners of FIG. 7 and such that the toggle lock fasteners can be channel inserted for lateral displacement within the associated surface mounted rails 10/12 and 48/50 (see again FIG. 12) or at 62, 64, 66, et seq. (FIG. 6A).

Each of the toggle lock fasteners further includes a pair of spaced apart tabs 102 and 104 projecting from each base 100 in a manner which permit outermost portions thereof to project beyond the spaced apart channel defining surfaces 36 and 38 associated with each selected rail (and as shown in cutaway in FIG. 12 in relation to selected rail 10). A cylindrical shaped toggle element 106 is mounted about a vertical axis defined by a pin 108 extending widthwise through the toggle and supported to the tabs 102 and 104. In this fashion, the toggle lock fasteners are first pre-positioned within the channel rails 10, 12, 48 and 50, following a modified array of spaced apart apertures 96' associated with the flexible or rigid binding or perimeter 94 associated with the covering 92 are mounted over the toggle elements in the perpendicular extending positions shown in FIG. 10 relative to the support base 100, following which the toggle elements 106 are rotated to the position of FIGS. 11 and 12.

FIG. 10A illustrates one non-limited example of a substitutable modification of toggle lock fastener as compared to that described in FIG. 10 and in which a pseudo-cylindrical shaped post or body 110 extends from a reconfigured channel seating base 100' (this including such as dovetail apertures defined therein for receiving other types of mounting fasteners in other applications separate from sliding insertion within the rail channels as described herein). The generally cylindrical shaped body 110 is solid proximate its integral mounting location with the flat and rectangular shaped channel seating base 100' and includes a pair of extending ears or lobes 112 and 114, these in turn establishing an inner slot or channel having a desired profile for seating therebetween a generally planar, curved edged and rotatable toggle element 116 mounted for rotation between the ears or lobes 112 and 114 via a horizontal pin 118.

The toggle fastener depicted in FIG. 10A is both installed and manipulated in a substantially identical fashion as compared to that in FIG. 10 and it is further envisioned that other variations of either twist or toggle lock fasteners can be employed within the scope of the invention. FIG. 10B is a perspective of a further variant of a toggle lock fastener of FIG. 10A exhibiting a lengthened fixed support portion 110' for accommodating any of thicker filter screens, multiple layer screens, or other coverings, and such as is again reflected by the dual layer covering arrangement of FIGS. 8A and 9A.

Figure 14:
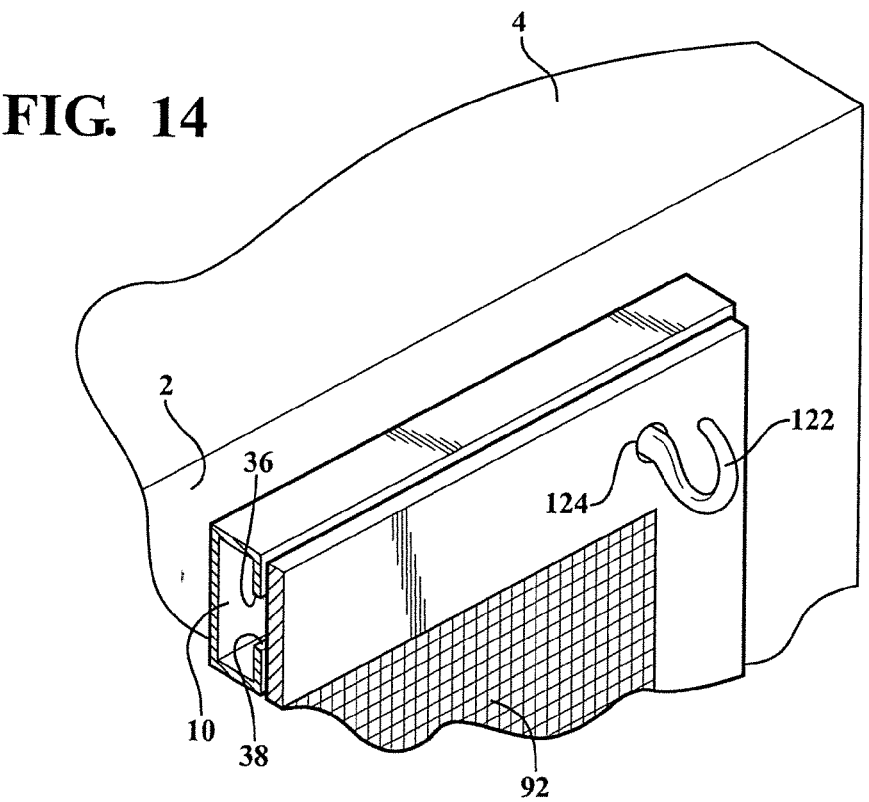
FIG. 14 is an enlarged, assembled and corner perspective of the embodiment of FIG. 13 and illustrating a selected corner located hook supporting fastener in an engaged position relative to an outer receiving location of the outer covering.

FIG. 13 is an exploded illustration of a yet further embodiment incorporating a plurality of reconfigured and channel rail mounted hook fasteners including base shaped channel rail supports 120 from which project hook shaped elements 122. The covering material 92 exhibits a series of apertures 124 arranged in spaced apart fashion about an outer flexible or rigid perimeter of the covering, such further including reinforced ringlets or grommets (both plastic or metal) for preventing tearing of the binding, with the further understanding that suitable rectangular shaped outer reinforcements can also be integrated into the covering apertures 96 and 96' depicted respectively in FIGS. 7 and 10. FIG. 14 is an enlarged, assembled and corner perspective of the embodiment of FIG. 13 and illustrating a selected corner located hook supporting fastener 122 in an engaged position relative to an outer receiving location (aperture) 124 of the outer covering 92.

Figure 16:
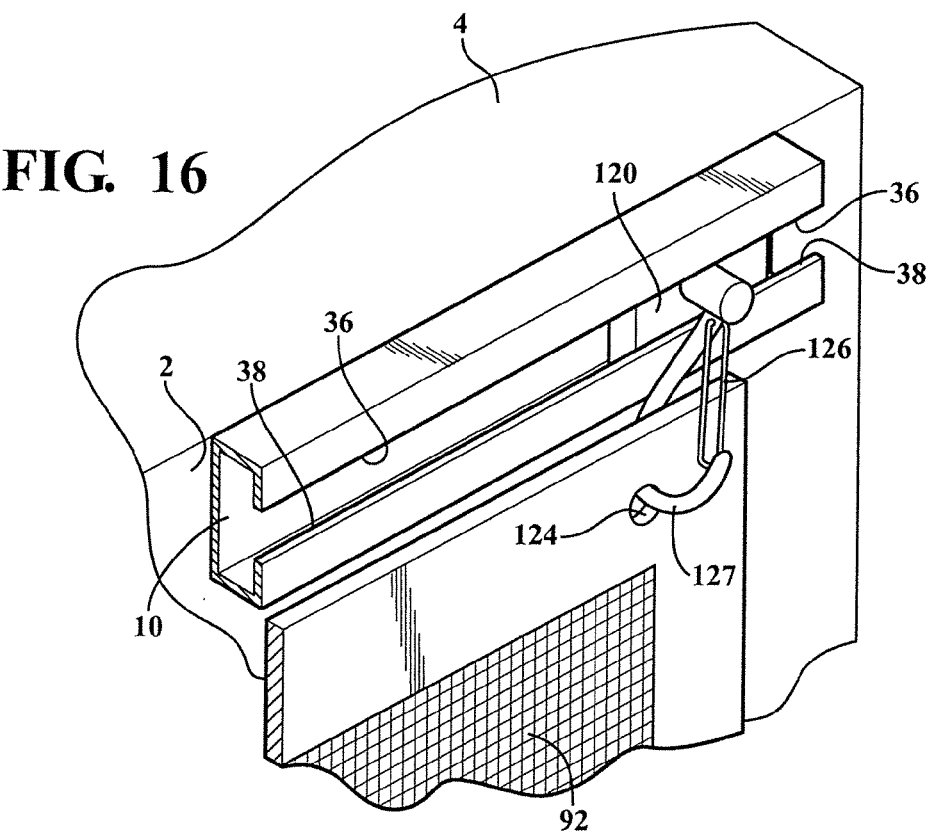
FIG. 16 is an enlarged, assembled and corner perspective of the embodiment of FIG. 15 and illustrating a selected corner located carabiner supporting fastener in an engaged position relative to an outer receiving location of the outer covering.
Figure 15:
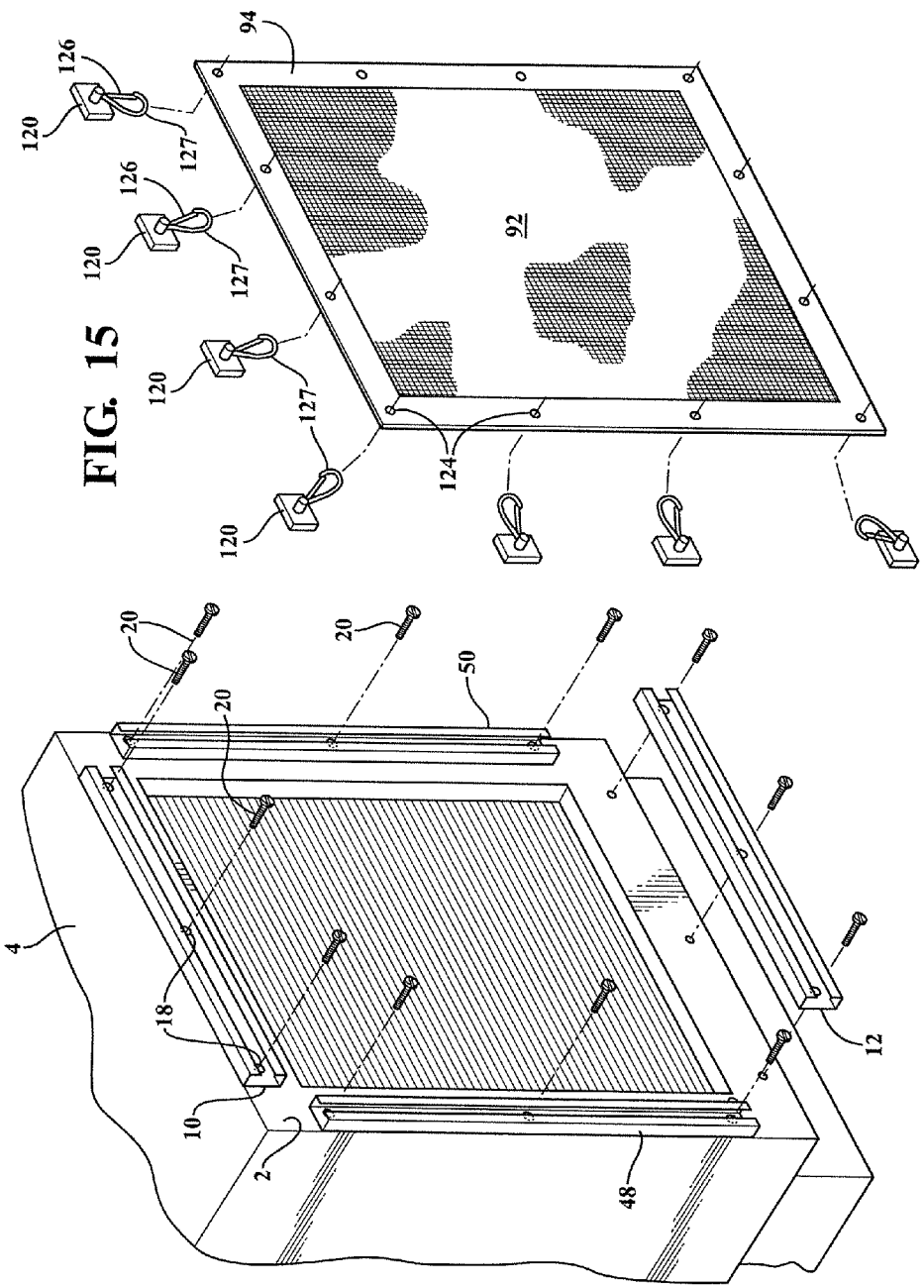
FIG. 15 is an exploded illustration of a yet further embodiment incorporating a plurality of reconfigured and carabiner type fasteners.

FIG. 15 is an exploded illustration of a yet further embodiment incorporating a plurality of reconfigured and carabiner type fasteners, these including once again insertable planar rectangular base supports 120 from which are pivotally supported individual and spring biasing carabiners 126. FIG. 16 is an enlarged, assembled and corner perspective of the embodiment of FIG. 15 and illustrating a selected corner located carabiner, see spring biased portion 126 pivotal relative to a hook main portion 127, and shown in an engaged position relative to an outer receiving aperture 124 of the reinforced outer covering 94 of the material 92.

Figure 17:
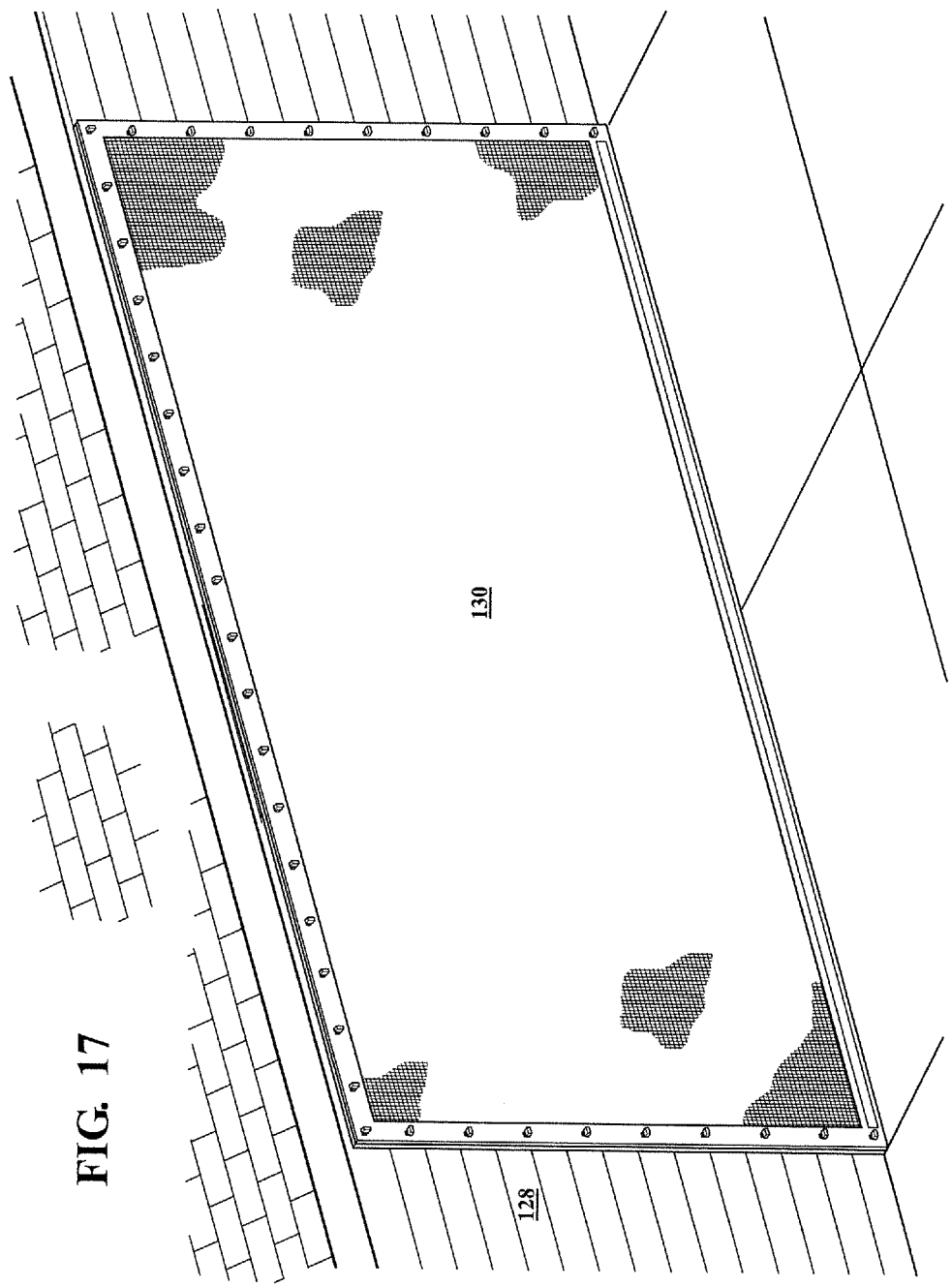
FIG. 17 is an environmental view of a further application of fastener and channel rail mounted assembly applied over an enlarged garage door type opening.

FIG. 17 is an environmental view of a further application of fastener and channel rail mounted assembly (this depicting for exemplary sake the twist lock fasteners 90 previously described in FIGS. 7-9 and which are installed over a plurality of three edge proximate interconnecting channel rails (not shown but generally corresponding to top rail 10 and side rails 48 and 50 with bottom rail 12 deleted) in turn secured to edge proximate extending locations associated with any type of opening (also hidden from view), and such as further depicted as an enlarged garage door or like opening associated with a structure 128. A suitably dimensioned covering material 130 is provided and which can again include any type of breathable mesh or impervious material, about which extends either a flexible or rigid binding or perimeter through which are formed a suitable array of spaced apertures (such as previously depicted at 96 in FIG. 7) for facilitating installation of the material 130.

Figure 18:
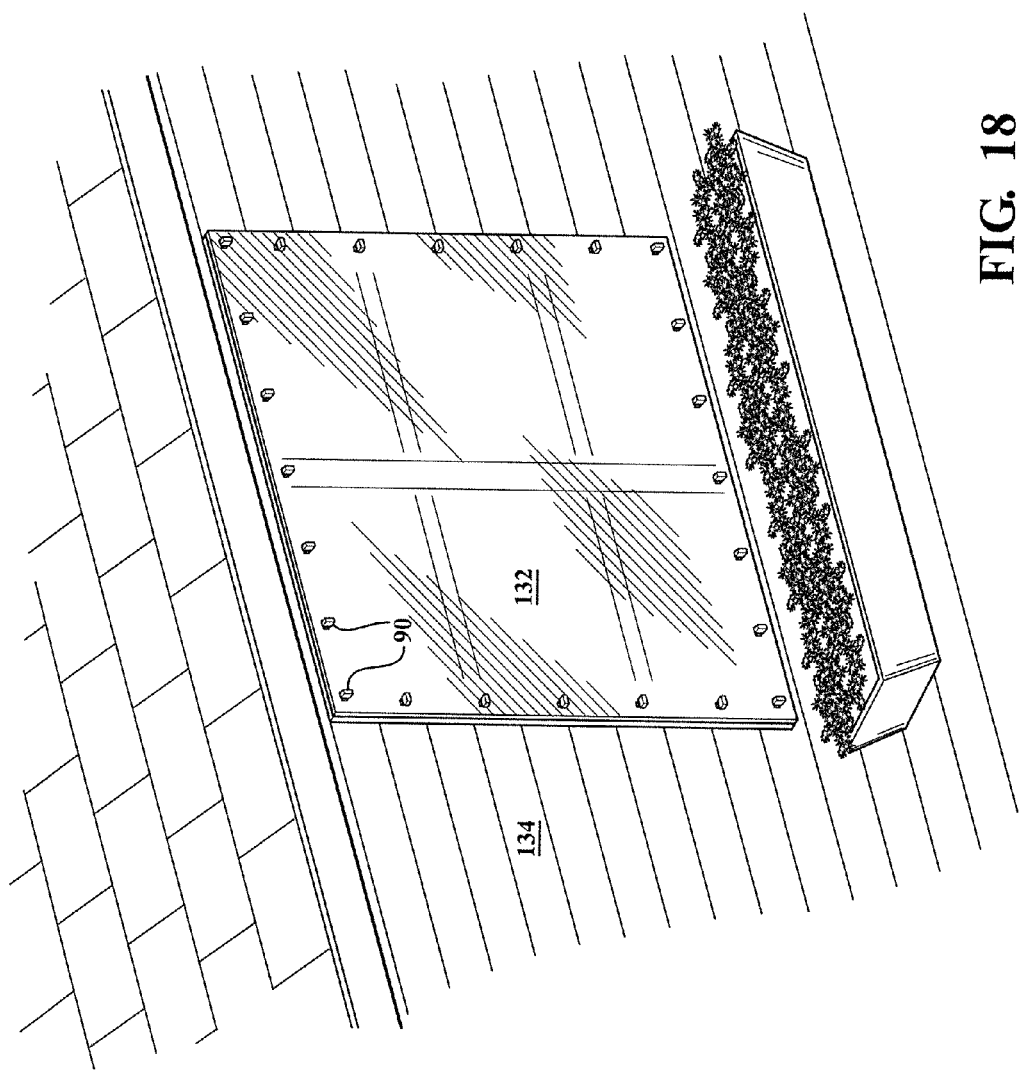
FIG. 18 is a yet further environmental view of a yet further application applied over a window type opening.

Finally, FIG. 18 is a yet further environmental view of a yet further application of fasteners (again twist lock type fastener 90) applied over a window type opening about which are secured an arrangement of four rails 10, 12, 48 and 50 in the manner previously described. A covering 132 is depicted mounted over the window or like opening (not shown) associated with a structure 134, and which may again possess a similar arrangement of binding edge extending mounting apertures for receiving the individual twist lock portions 90. The covering 132 is further depicted as a plasticized or other impervious material (such further optionally exhibiting transparent or translucent properties) as a winterizing cover and as opposed to alternate use with a seasonal and breathable mesh depicted previously at 92. In this fashion a variety of different covering materials, varying by weight and or construction, can be provided as alternate covering for different seasons (e.g. mesh material in summer and impervious/heavy duty sealing cover for winter).

Figure 19:
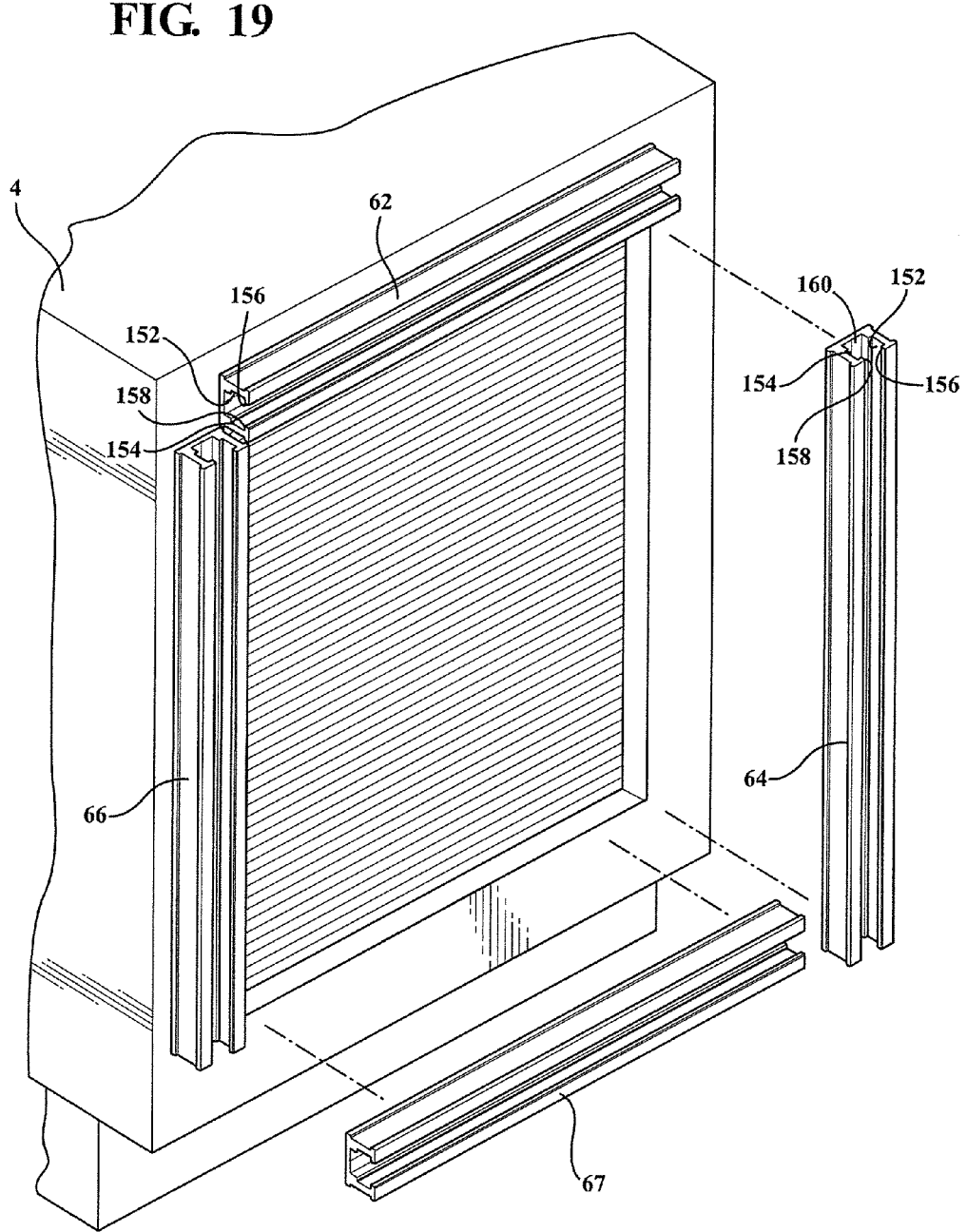
FIG. 19 is a partially exploded perspective of a further variant of the assembly and illustrating a plurality of modified elongated track defining supports secured to the air intake face surrounding the central opening.

Referring to FIG. 19, a partially exploded perspective is shown of a further variant of the assembly and illustrating the plurality of modified elongated track defining supports previously depicted at 62, 64, 66 (and further at 67), secured to the air intake face of the associated structure 4 surrounding the central opening. As previously described, the track defined supports can exhibit any desired cross sectional shape or profile and may, in one non-limited example, be constructed of an aluminum, plastic or other suitable extruded, stamped or otherwise formed material.

As further shown, the track supports may exhibit a modified "U" shaped inner channel or profile for receiving the inserting portions of the various fastener arrangements for securing the filter or mesh to the arranged track supports. As will also be described and shown in additional detail, the supports have an increased cross sectional thickness, with their cross sectional interior channels exhibiting irregular or stepped surfaces (as compared to the channel supports 10, 12 in FIG. 1).

FIG. 20 is a cross sectional cutaway of a selected track support 62 from FIG. 19 and illustrating an underside positioned magnet 132 (see also FIG. 33) for assisting in releasably securing the support in extending fashion along a metal receiving surface of the intake face 4. Corresponding FIG. 32 is a cutaway plan illustration of selected track support 62 and depicting a two-sided adhesive tape 134 backing for securing the support to an intake face location.

Figure 32:
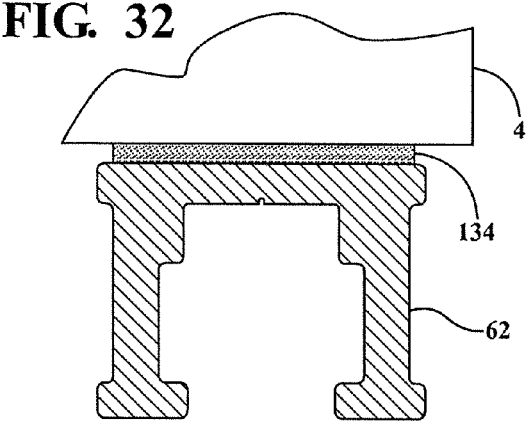
FIG. 32 is a cutaway plan illustration of a selected track support and depicting a two-sided adhesive tape backing for securing the support to an intake face location.
Figure 33:
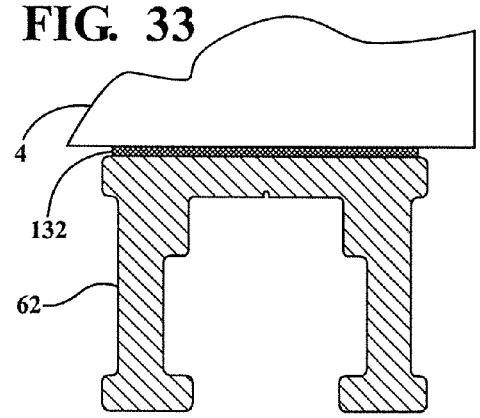
FIG. 33 is a similar plan illustration of the magnetic backing of FIG. 20 for securing the track support of FIG. 32 to the intake face location.
Figure 34:
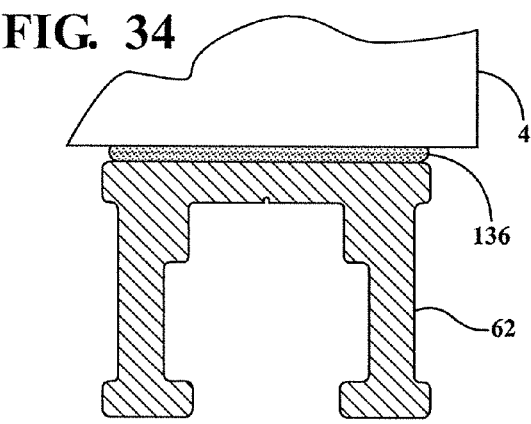
FIG. 34 is a further plan illustration similar to FIGS. 32-33 of a glue for attaching the track support to the intake face location.
Figure 35:
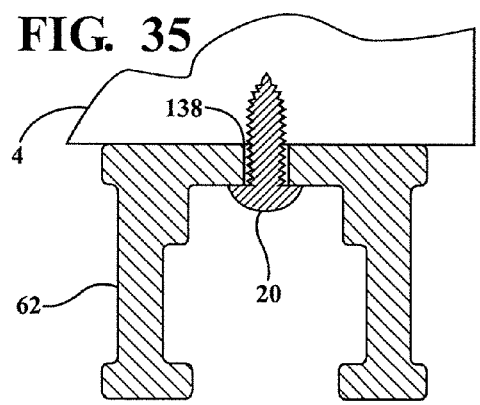
FIG. 35 is a yet further plan illustration of a screw passing through an aperture in the base of the track support for mounting to the intake face location.

FIG. 34 is a further plan illustration similar to FIGS. 32-33 of a glue 136 for attaching the track support 62 to the intake face location. FIG. 35 is a yet further plan illustration of a conventional screw, again at 20, passing through an aperture 138 in a base of the track support for mounting to the intake face location.

Proceeding to FIG. 21, an illustration is provided generally at 140 of a selected twist lock fastener utilized in the engagement protocol of FIG. 20. Similar to the twist lock variant previously disclosed, a generally planar base 142 is adapted to being received within the open end of the interior channel or track defined in the elongated support, a fixed body portion 144 extending from the base and concluding in an end support twist lock portion 146 (see further rotated position 146' depicted in phantom). The base 142 further exhibits widened end support locations 148 and 150, these being dimensioned for facilitating frictional and positional fitting within the interior track defining sides, see at 152 and 154 of the support 62 in FIG. 20, concurrent with the upper edge surfaces of the base 142 abutting the forward inside edges 156 and 158 associated with the narrowed slot, a rear or back surface 160 interconnecting the sides 152 and 154 and completing the interior channel profile.

FIG. 22 is a cross sectional cutaway of a selected track support 62 as previously shown in FIG. 20 and illustrating a variant 140' of the twist lock fastener exhibiting a lengthened fixed support portion 144'. FIG. 23 is an illustration of the modified twist lock fastener, similar to that shown in FIG. 21, and exhibiting the fastener 140' installed in the track support 62 such that the lengthened fixed support portion 144' is capable of accommodating any of thicker filter screens, multiple layer screens or materials (see as depicted at 92/92' with dual layers of reinforced edges 94/94' and aligning ringlet or grommet defined receiving apertures 92. As with the variant of fastener in FIG. 21, the widened base locations 148 and 150 facilitate frictional engagement along the interior side edges 152 and 154 of the supports.

Figure 24:
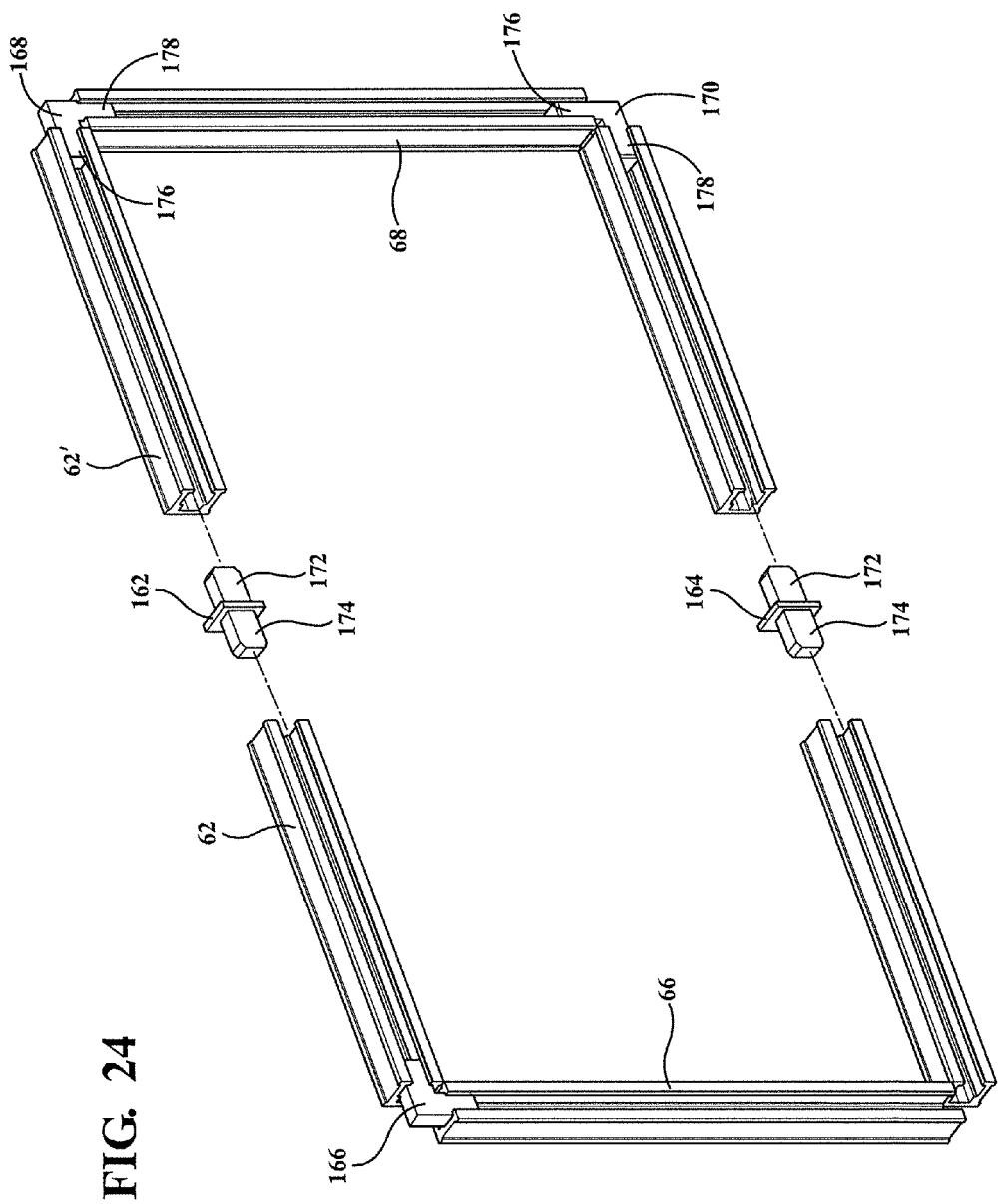
FIG. 24 is a partially exploded view of a support track according to a modification of FIG. 19 and which includes the provision of intermediate end-to-end and corner/angled adaptors or plugs for assembling running lengths of support track in varying arrangements upon the air intake face.

FIG. 24 is a partially exploded view of a support track arrangement according to a modification of FIG. 19 and which includes the provision of intermediate end-to-end 162 and 164 and corner/angled 166, 168, 170, et seq. adaptors or plugs for assembling running lengths of support track (see further at 62/62', 66, 68, et seq.) in varying arrangements upon the air intake face. The intermediate adaptors 162 and 164, as shown, each exhibit a central support from which project a pair of opposite engaging portions 172/174 which are adapted to engage the interior defined channel ends of the supports. The corner/angled adaptors each further include a generally "L" shape with engaging portions 176 and 178 for joining angled ends of the support track, such as in the perpendicular arrangement shown.

Figure 24A:
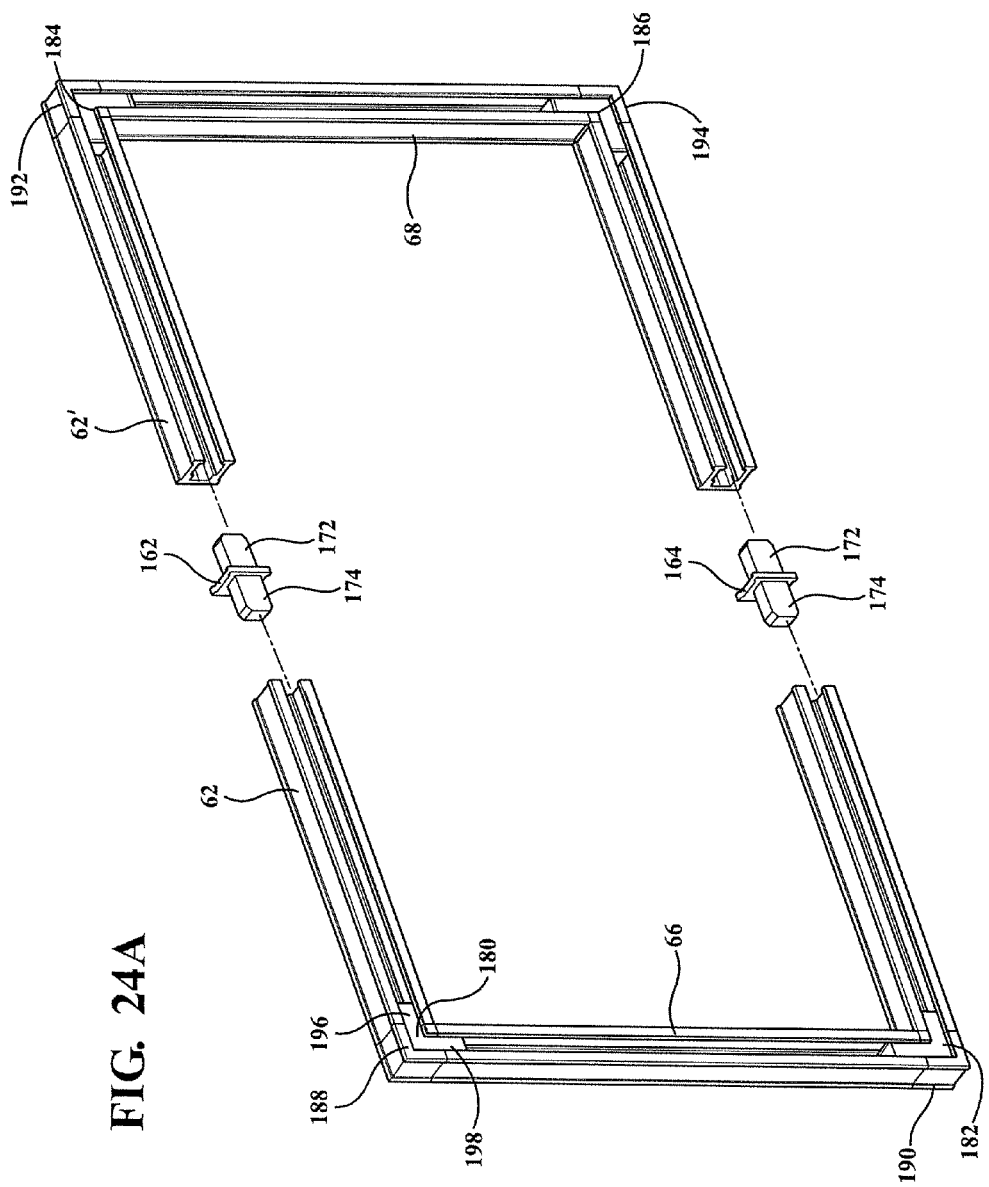
FIG. 24A is a similar illustration to FIG. 24 and showing a variant of the corner adaptors/plugs for providing the assembled support track with a seamless edge appearance.

FIG. 24A is a similar illustration to FIG. 24 and showing a variant of the corner adaptors/plugs, at 180, 182, 184, and 186 for providing the assembled support track as a rigid standalone frame with a seamless edge appearance. As further best shown in kit assembly view of FIG. 39, the modified corner plugs 180-186 each include an additional outer "L" shaped embossed portion, see at 188, 190, 192 and 194 corresponding to each plug 180-186. Upon the angled projecting portions (see further at 196 and 198 for selected plug 180) seating within the interior channels of associated angled supports 62/66, the outer embossed portions (188) of each corner plug seats against the ends surfaces of the channels to establish the seamless appearance shown.

FIGS. 24B-24C respectively illustrated exploded and assembled views of a further three sided variant of linear end-to-end adaptor, see at 191, which is configured to attached abutting opposing ends of first 62 and second 62' selected running lengths of support track, these being shown in reduced length. As best shown in FIG. 24B, the three sided linear adapter 191 exhibits a generally reverse "C" shape in cross section and defines an inside configured profile (see interconnected surfaces 193, 195 and 197) which is adapted to slidingly receive and seat the opposing ends of the track 62/62' in abutting fashion.

The adapter 191 can include any flexible material, such as a heavy duty nylon or plastic which has a high degree of resilience and, as further shown, is flexibly applied over the three projecting sides of the opposing mating ends of the track sections 62/62', so that the end-most opposing track sections are thereafter frictionally gripped and restrained within the inner "C" defined surfaces 193, 195 and 197. Without limitation, the opposing ends of the tracks can be inserted within the adaptors 191 (as well as the adaptors variant depicted at 162/164 in FIG. 24), either prior or subsequent to mounting the track sections to the air intake face. In this fashion, the present inventions provide for a rigid stand-alone frame construction for supporting the screen or other covering.

As further understood, the construction of the connectors/plugs can include a compressible polymer or the like (such also potentially including a foam outer layering) which can frictionally seat within the irregular end profile of the supports and facilitates seating engagement between the linear end-to-end or angled supports and thereby provides for secure and seamless engagement between the interconnected sections of track support.

Figure 25:
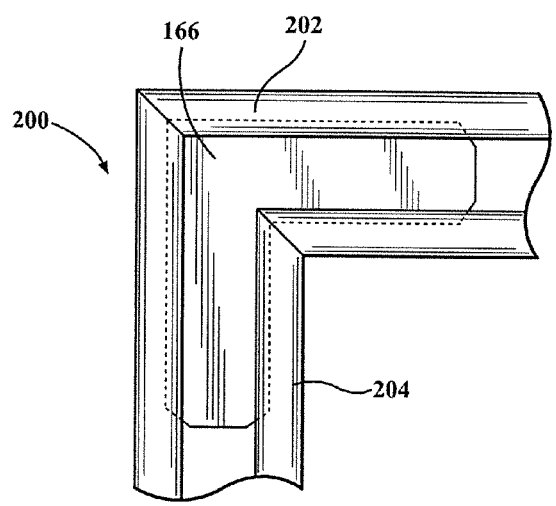
FIG. 25 is a partial corner depiction of a further joining arrangement established between perpendicular arranged support track and having a mitered appearance.
Figure 26:
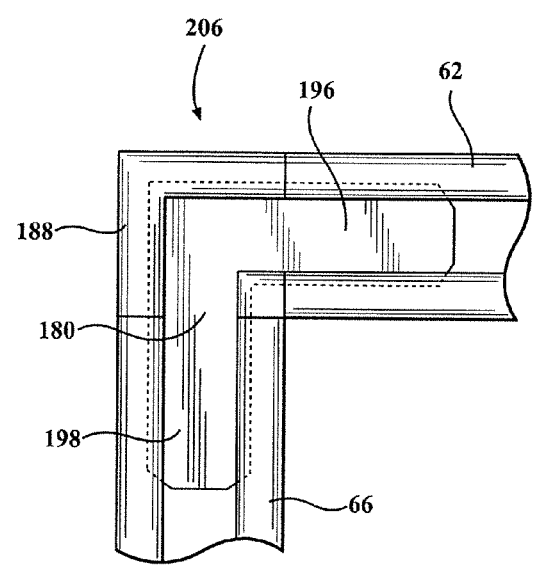
FIG. 26 is a corresponding corner depiction showing the modified corner adaptors of FIG. 24A.
Figure 27:
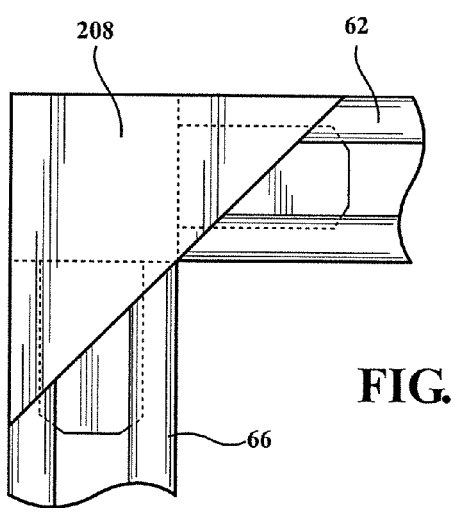
FIG. 27 is a further variant of a three dimensional triangular enclosure utilized with any variant of corner plug/adaptor and for providing additional structural support between angled extending ends of support track.
Figure 28:
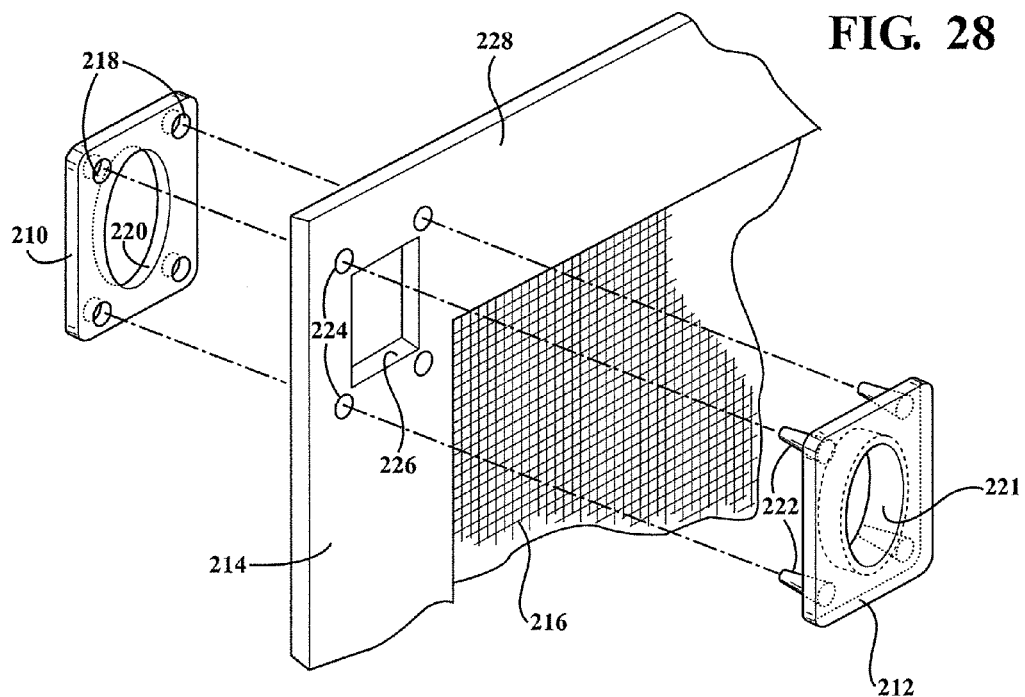
FIG. 28 is an illustration of a further variant of screen attached grommet in the form of a two-piece sandwich configuration for inter-engaging through opposite sides of a reinforced corner location of an associated screen.

FIG. 25 is a partial corner depiction, generally at 200 of a further joining arrangement established between perpendicular arranged support track 202 and 204, such having a mitered appearance and within opposing ends of which the angled corner adaptors 166 is frictionally seated. FIG. 26 is a corresponding corner depiction, generally at 206, showing the modified corner adaptors of FIG. 24A. FIG. 27 is a further variant of a three dimensional triangular enclosure 208 utilized with any variant of corner plug/adaptors and for providing additional structural support between angled extending ends of support track 62 and 66;

FIG. 28 is an illustration of a further variant of screen attached grommet in the form of a two-piece sandwich configuration 210 and 212 for inter-engaging through opposite sides of a reinforced corner location 214 of an associated screen 216. The grommets each include a planar disc shape with the first piece 210 having perimeter defined apertures 218 and a central receiving aperture 220. The second piece 212 likewise includes a plurality of prongs 222 projecting from a surface thereof (a central aperture 221 also defined in the piece 212) and which, upon piercing through the covering or screen 216 (see as depicted by aperture patterns 224, 226, et sq. Defined in the reinforced edge 214) resistively engage and seat within the perimeter defined apertures 218 of the first piece 210 in order to mount both pieces together on opposite sides of the material with the inner apertures 220/221 in alignment.

Figure 29:
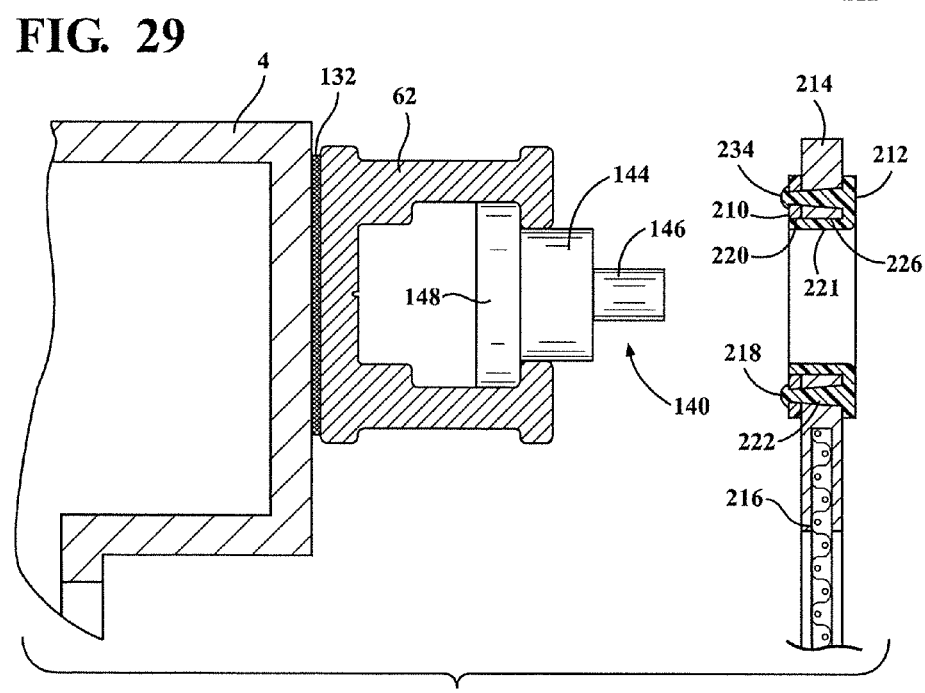
FIG. 29 is a further partially exploded plan view of the assembled screen grommet of FIG. 28 in combination with the toggle lock fastener of FIGS. 20-21.

The two piece grommet assembly can also be utilized with a knife edge such that, and upon mounting in sandwiching fashion about the screen (not previously apertured such as at 224/226), the knife edge can be utilized to cut out the screen portion revealed by the mating aperture defining inner perimeter surfaces 220/221, this in order to create the necessary interior aperture for receiving the selected fastener portion. FIG. 29 is a further partially exploded plan view of the assembled screen grommet of FIG. 28 in combination with the twist lock fastener (140) of FIGS. 21 and 23.

Figure 30:
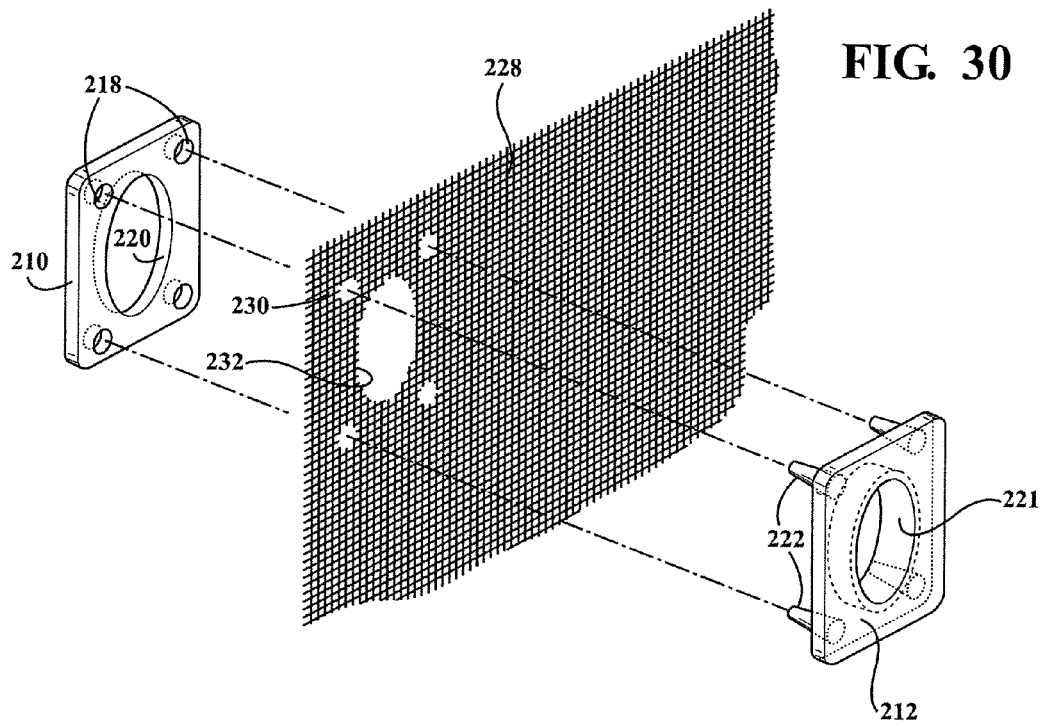
FIG. 30 is an illustration similar to FIG. 28 and depicting an unreinforced screen utilized in combination with the two piece assembleable grommet.

FIG. 30 is an illustration similar to FIG. 28 and depicting an unreinforced screen 228 utilized in combination with the two piece assembleable grommet 210/212. As with the embodiment of FIGS. 28-29, the two pieces are assembleable in a manner which sandwiches a perimeter location of the screen 228, such as which can exhibit pre-apertured locations 230, 232, et sq.

Figure 31:
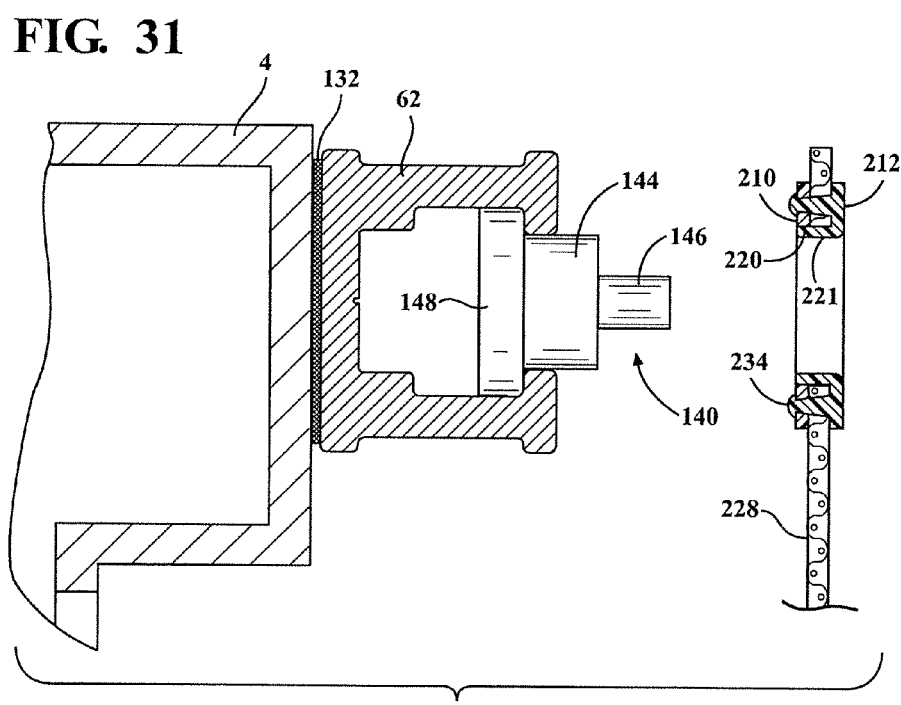
FIG. 31 is a further partially exploded plan view of the assembled screen grommet of FIG. 30 in combination with the toggle lock fastener of FIGS. 20-21.

Alternately, the screen 228 can be provided in stock form without any pre-incisions, such as along the perimeter receiving locations for receiving the grommets. The screen 228 can be sized, on site, such as with the use of a knife edge. It is also envisioned that the variations of the prongs 222 can also include rounded end locations (see at 234 in cutaway in each of FIGS. 29 and 31) which are sufficiently deformable in order to pass through the interior profiles defined by the mating apertures 218 of the grommet piece 210, and subsequently engage the reverse (rear) surface locations of the piece 210 in order to maintain the sandwiched locations of the grommets pieces 210/212 with the screen therebetween. FIG. 31 is a further partially exploded plan view of the assembled screen grommet of FIG. 30 in combination with the twist lock fastener of FIGS. 21 and 23.

Figure 36:
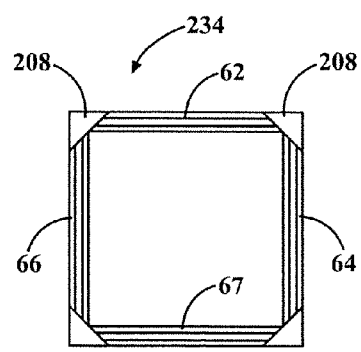
FIG. 36 is a front plan illustration of a square support track arrangement in combination with the triangular three dimensional corner supports of FIG. 27.

Proceeding to FIG. 36, a front plan illustration is generally shown at 234 of a square track support arrangement (see supports 62, 64, 66 and 67) in combination with the triangular three dimensional corner supports 208 of FIG. 27. The corner supports, as previously described, each include a triangular 3D construction and exhibit a hollow interior and can be concurrently fastened to the air intake surface for providing aligning and retaining support between opposing arrayed ends of track support, such further attached fixedly or removably in any fashion desired and which can further include any of end-to-end, mitred or other interconnecting arrangement.

Figure 37:
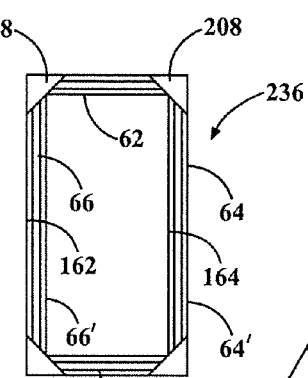
FIG. 37 is a front plan view similar to FIG. 36 of a rectangular support track arrangement.
Figure 38:
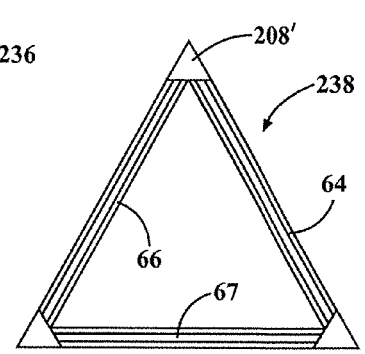
FIG. 38 is a further front plan view of a triangular support track arrangement.

FIG. 37 is a front plan view, similar to FIG. 36, of a rectangular support track arrangement 236, such as which can be assembled using the linear adapters 162/164, in combination with pairs 64/64' and 66/66' of elongated track supports in combination with upper 62 and lower 67 interconnecting supports. FIG. 38 is a further front plan view of a triangular support track arrangement 238 and which is shown with three supports 65, 66 and 67 along with a modification 208' of the three dimensional corner supports. The triangular arrangement 238 is provided to support the proposition that the supports can be configured or arrayed in any perimeter extending fashion for covering any type of air intake opening.

Figure 39:
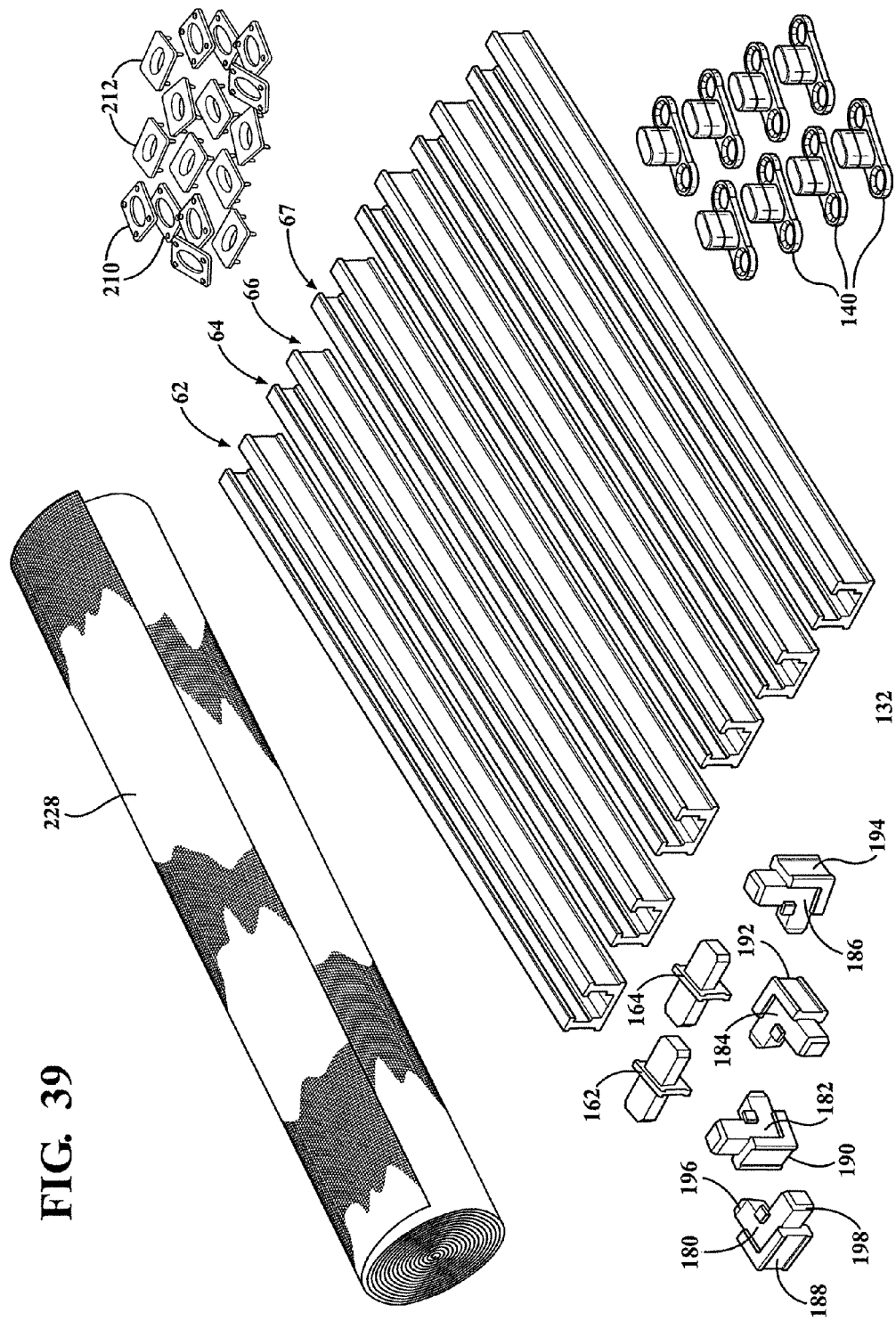
FIG. 39 is a kit illustration depicting a plurality of support tracks, stock filter, assembleable grommets, and twist lock fasteners (FIG. 21), according to one non-limiting variant of the present inventions.

Finally, FIG. 39 is a kit illustration depicting one non-limiting combination of items utilized in the method and assembly of constructing a screen, mesh or other covering supported upon the intake face over the air intake opening. As described, the kit and assembly can include a selected plurality of the support tracks, 62, 64, 66, 67, et sq., stock filter or other flexible mesh or non-mesh material 228, assembleable grommets 210/212, any type of fastener (represented by twist lock fasteners 140 of FIG. 21), and any combination of linear end-to-end 162/164 and angled/corner 180, 182, 184, et sq. interconnecting adaptors according to any one of a number of non-limiting variant of the present inventions.

As further shown, the supports 62, 64, 66 and 67 can include magnetic backings 132 (or alternatively any other permanent or removable mounting options as previously described not limited to adhesives, adhesive tape, fasteners, glue, etc.). Advantages of the present invention include the ability to both quickly install any desired covering material utilizing any of the fasteners previously disclosed, combined with the self-aligning aspects provided by the combination of channel rails and fasteners, this in order to accommodate variations in production tolerances of the filter as it translates to installation and alignment when installed.

Additional variants further envision the utilization of any number of channel supporting rails typically ranging from one to four, with two, three or four such rails being the typical arrangements. Having described my invention, other and additional preferred embodiments will become apparent to those skilled in the art to which it pertains and without deviating from the scope of the appended claims.

I claim:

1. An assembly for covering an air intake opening of a piece of HVAC equipment, the HVAC equipment having a perimeter extending face surrounding the intake opening, said assembly comprising:

a plurality of elongated supports arranged in extending fashion around the intake opening, each of said supports having a base surface adapted to being removably secured along the perimeter extending face, each of said supports exhibiting a modified "U" shaped cross sectional shape with a forwardly projecting support surface within which is configured a slot;

a plurality of fasteners installable through an accessible end location of each support such that a base of each fastener is retained within and traversable along an interior channel defined in said support, a projecting portion of each fastener extending from said base and through said slot;

a plurality of inserts, each exhibiting opposite extending engaging portions which are rectangular in cross section and are dimensioned approximate to an open interior of said elongated supports so that said inserts resistively seat within opposing arrayed interiors of said elongated supports in order to create a compression fit engagement between end locations of opposing extending supports to define a closed perimeter, said inserts being removable upon dismounting of said elongated supports from the perimeter extending face;

said inserts further including each of corner connectors and intermediate connectors, said intermediate connectors each having a perimeter extending central support from which project said opposite engaging portions in order to establish a seamless appearance with said elongated supports; and a filter having a plurality of perimeter defined apertures receiving said projecting portions of said traversable fasteners in order to removably affix said filter against said forwardly projecting support surfaces of said perimeter extending supports and to extend over the intake opening.

2. The assembly as described in 1, said projecting portion of each fastener further comprising a fixed extending portion and an end-most extending and rotatable twist lock portion.

3. The assembly as described in claim 1, said projecting portion of each fastener further comprising a fixed extending portion and an end-most extending and rotatable toggle lock fastener.

4. The assembly as described in claim 1, said projecting portion of each fastener further comprising a hook shaped fastener.

5. The assembly as described in claim 1, said projecting portion of each fastener further comprising a carabiner type fastener.

6. The assembly as described in claim 1, said base of each fastener further comprising a planar shape which is dimensioned for resistively engaging opposing inner spaced apart surfaces of said support establishing said interior channel in order to retain a pre-located position which can be overcome through a sufficient application of lateral force.

7. The assembly as described in claim 1, said inserts further comprising each of angled and linear interconnecting configurations for configuring the perimeter as any of a square or rectangular.

8. The assembly as described in claim 1, further comprising any of a two-sided adhesive tape, a magnet, a glue or screw/bolt for securing said base surface of each support to the perimeter extending face.

9. An HVAC assembly, comprising:

a body having a perimeter extending face surrounding an air intake opening;

a plurality of elongated supports arranged in extending fashion around the intake opening, each of said supports having a base surface adapted to being releasably secured along the perimeter extending face, each of said supports exhibiting a modified "U" shaped cross sectional shape with a forwardly projecting support surface within which is configured a slot;

a plurality of fastener sub-assemblies, each including a first insertable component installable through an accessible end location of each support such that said first component is retained within and traversable along an interior channel defined in said support;

a plurality of inserts, each exhibiting opposite extending engaging portions which are rectangular in cross section and are dimensioned approximate to an open interior of said elongated supports so that said inserts resistively seat within opposing arrayed interiors of said elongated supports in order to create a compression fit engagement between end locations of opposing extending supports to define a closed perimeter;

said inserts further including each of corner connectors and intermediate connectors, said intermediate connectors each having a perimeter extending central support from which project said opposite engaging portions in order to establish a seamless appearance with said elongated supports;

a flexible ply material within which are defined a plurality of perimeter defined apertures; and each of said fasteners further including a second extending component for engaging said first component and in order to sandwich opposite surfaces of said material to affix the material to the supports in extending fashion over the intake opening.

10. The assembly as described in claim 9, said first component of each fastener sub-assembly further comprising a hex head bolt seated within an interior channel associated with each support, said second component further comprising a tightening nut.

11. The assembly as described in claim 9, said first component of each fastener sub-assembly further comprising a washer having linear extending edges seated within an interior channel associated with each support, a protuberant collar of said washer defining a central and interiorly threaded aperture, said second component including a hybrid tightening nut with threaded shaft extending therefrom and engaging said washer.

12. The assembly as described in claim 9, said inserts further comprising each of angled and linear interconnecting configurations for configuring the perimeter as any of a square or rectangular.

13. An assembly kit for installing a flexible ply material to a perimeter extending face of a piece of HVAC equipment surrounding an air intake opening, said kit comprising:

a plurality of elongated supports adapted to being arranged in extending fashion around the intake opening, each of said supports having a base surface with apertures formed there through for receiving anchor fasteners adapted to secure said base surface flush against the face of the intake opening, each of said supports exhibiting a modified "U" shaped cross sectional shape with a forwardly projecting support surface within which is configured a slot;

a plurality of fasteners installable through an accessible end location of each support such that a base of each fastener is retained within and traversable along an interior channel defined in said support, a projecting portion of each fastener extending from said base and through said slot;

a plurality of inserts, each exhibiting opposite extending engaging portions which are rectangular in cross section and are dimensioned approximate to an open interior of said elongated supports so that said inserts resistively seat in a compression fit fashion within opposing extending supports to define a closed perimeter, said inserts further including each of corner angled and intermediate linear interconnecting configurations for configuring an extending perimeter of said elongated supports, said corner inserts further including intermediate embossed portions and said intermediate inserts each further including a perimeter extending central support from which project said opposite engaging portions which, upon engaging within said opposing supports, defining a seamless appearance around said closed perimeter, said inserts being compression fitted for resistance to removability upon dismounting of said elongated supports from the perimeter extending face; and the flexible ply material having a plurality of perimeter defined apertures configured about the flexible material for receiving said fasteners to removably affix the material to the perimeter extending supports and to extend over the intake opening.

14. The kit as described in claim 13, further comprising a grommet in the form of a two-piece sandwich configuration for inter-engaging through opposite sides of a corner location of the flexible ply material.

15. The kit as described in claim 13, said projecting portion of each fastener further comprising a fixed extending portion and an end-most extending and rotatable twist lock portion.

16. The kit as described in claim 13, said projecting portion of each fastener further comprising a fixed extending portion and an end-most extending and rotatable toggle lock fastener.

17. The kit as described in claim 13, said fasteners each further comprising a washer having linear extending edges seated within an interior channel associated with each support, a protuberant collar of said washer defining a central and interiorly threaded aperture, a hybrid tightening nut or knob with threaded shaft extending therefrom and engaging said washer to sandwich opposite sides of the flexible ply material.

18. The kit as described in claim 13, said base of each fastener further comprising a planar shape which is dimensioned for resistively engaging opposing inner spaced apart surfaces of said support establishing said interior channel in order to retain a pre-located position which can be overcome through a sufficient application of lateral force.

19. The kit as described in claim 13, the flexible ply material further comprising a reinforced outer perimeter edge.

* * * * *